(12) United States Patent
Wong et al.

(10) Patent No.: US 8,707,343 B2
(45) Date of Patent: *Apr. 22, 2014

(54) METHOD AND APPARATUS FOR COLLECTING VIEWER SURVEY DATA AND FOR PROVIDING COMPENSATION FOR SAME

(75) Inventors: Robert Masao Wong, Santa Monica, CA (US); Richard W. Tom, Marina Del Ray, CA (US); Wei Eugene Chuan-Huai, Los Angeles, CA (US); Jason A. Kilar, Santa Monica, CA (US)

(73) Assignee: Hulu, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,602

(22) Filed: Jul. 31, 2012

(65) Prior Publication Data

US 2012/0297408 A1 Nov. 22, 2012

Related U.S. Application Data

(63) Continuation of application No. 12/627,311, filed on Nov. 30, 2009, now Pat. No. 8,239,889, which is a continuation-in-part of application No. 12/401,547, filed on Mar. 10, 2009.

(60) Provisional application No. 61/035,243, filed on Mar. 10, 2008.

(51) Int. Cl.
*H04H 60/33* (2008.01)
*H04N 7/10* (2006.01)
*H04N 7/16* (2011.01)
*H04N 7/025* (2006.01)

(52) U.S. Cl.
USPC ........ 725/23; 725/9; 725/32; 725/33; 725/34; 725/35; 725/36

(58) Field of Classification Search
USPC ............................................ 725/9, 23, 32–36
See application file for complete search history.

(56) References Cited

U.S. PATENT DOCUMENTS

| 5,832,494 A | 11/1998 | Egger et al. |
| 5,838,314 A | 11/1998 | Neel et al. |
| 5,889,506 A | 3/1999 | Lopresti et al. |

(Continued)

FOREIGN PATENT DOCUMENTS

| EP | 1197020 A2 | 4/2002 |
| GB | 2323489 A | 9/1998 |

(Continued)

OTHER PUBLICATIONS

"Gotuit and Pixsy Raise the Bar on Video Search," http://www.gotuit.com/press/2008/0930_Pixsy.html, 3 pages.

(Continued)

*Primary Examiner* — Dominic D Saltarelli
(74) *Attorney, Agent, or Firm* — Fountainhead Law Group P.C.

(57) ABSTRACT

To address the requirements described above, a method, apparatus, article of manufacture, and a memory structure for providing advertisements with a media program transmitted to a user computer. The method permits the user to provide survey responses in exchange for viewing a media program with fewer advertisement, and permits the user to manage the survey responses.

32 Claims, 23 Drawing Sheets

(56) References Cited

U.S. PATENT DOCUMENTS

| | | |
|---|---|---|
| 6,199,082 B1 | 3/2001 | Ferrel et al. |
| 2002/0032019 A1 | 3/2002 | Marks et al. |
| 2002/0087987 A1* | 7/2002 | Dudkiewicz et al. ........... 725/46 |
| 2002/0104096 A1 | 8/2002 | Cramer et al. |
| 2002/0108125 A1* | 8/2002 | Joao ............................ 725/139 |
| 2002/0188621 A1 | 12/2002 | Flank et al. |
| 2003/0149975 A1 | 8/2003 | Eldering et al. |
| 2003/0167202 A1 | 9/2003 | Marks et al. |
| 2004/0071453 A1 | 4/2004 | Valderas |
| 2004/0080528 A1 | 4/2004 | Rand et al. |
| 2004/0268413 A1 | 12/2004 | Reid et al. |
| 2005/0193015 A1 | 9/2005 | Logston et al. |
| 2006/0190808 A1 | 8/2006 | Balthaser |
| 2007/0162328 A1 | 7/2007 | Reich |
| 2007/0239683 A1 | 10/2007 | Gallagher |
| 2007/0244900 A1 | 10/2007 | Hopkins et al. |
| 2008/0033773 A1 | 2/2008 | Brazell |
| 2008/0060001 A1 | 3/2008 | Logan et al. |
| 2008/0066107 A1 | 3/2008 | Moonka et al. |
| 2008/0127251 A1 | 5/2008 | Wachtfogel et al. |
| 2008/0196060 A1 | 8/2008 | Varghese |
| 2009/0024927 A1 | 1/2009 | Schrock et al. |

FOREIGN PATENT DOCUMENTS

| | | |
|---|---|---|
| GB | 2443959 A | 5/2008 |
| WO | 0058940 A2 | 10/2000 |
| WO | 2005001656 A2 | 1/2005 |
| WO | 2005003899 A2 | 1/2005 |
| WO | 2007030621 A1 | 3/2007 |
| WO | 2007030751 A2 | 3/2007 |
| WO | 2007130472 A2 | 11/2007 |
| WO | 2008011091 A1 | 1/2008 |

OTHER PUBLICATIONS

"Gotuit Announces Integration with DoubleClick," http://www.gotuit.com/press/2008/1022_DoubleClick.html, 1 page.

"Gotuit Publishes White Paper. The Currency of Internet Video," http://www.gotuit.com/press/2008/1028_Whitepaper_CurrencyOfinternetVideo.html, 1 page.

"The Currency of Internet Video: The Importance of Quality Metadata in Monetizing Internet Video," Gotuit White Paper, Oct. 2008, pp. 1-13.

* cited by examiner

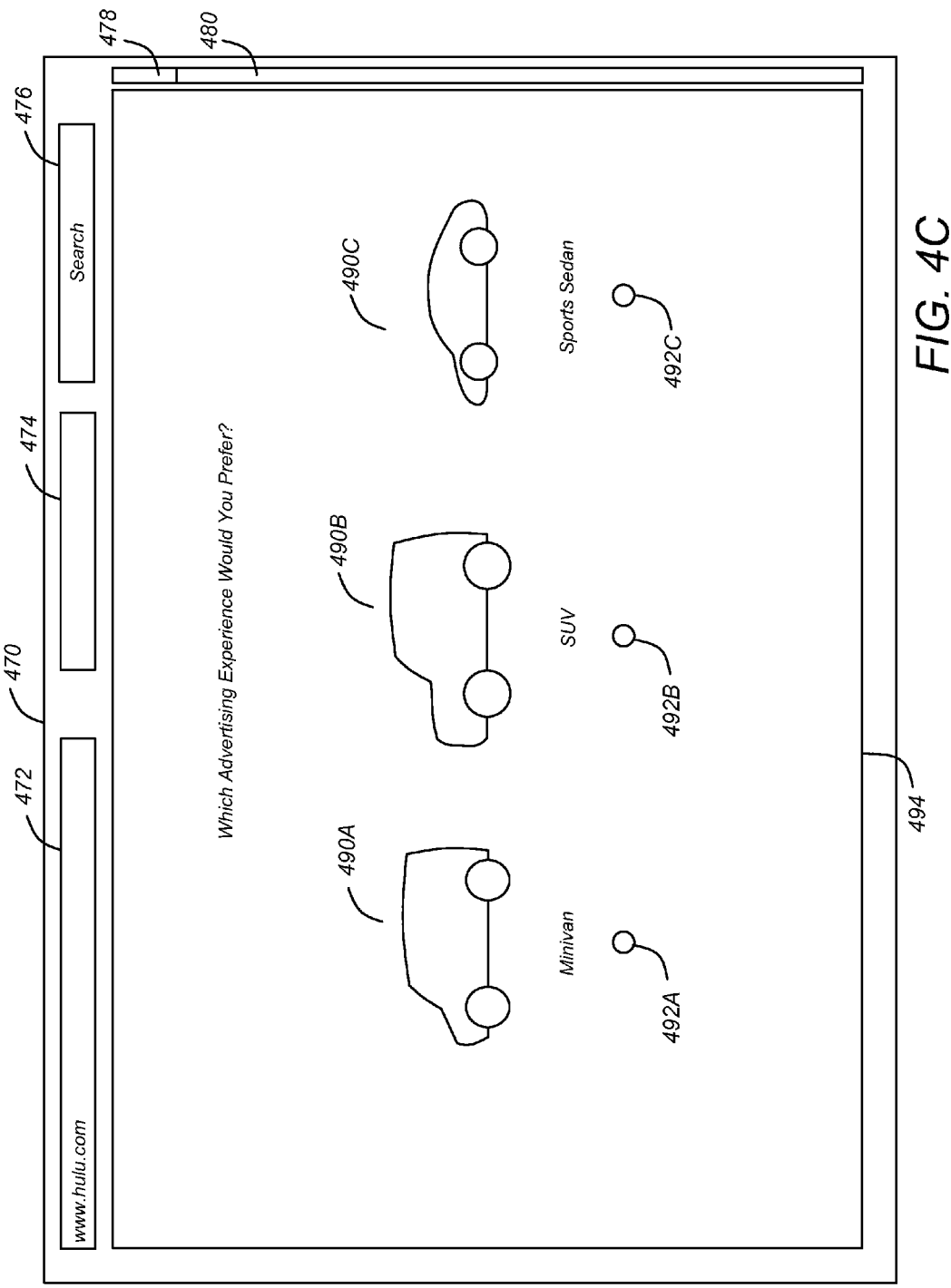

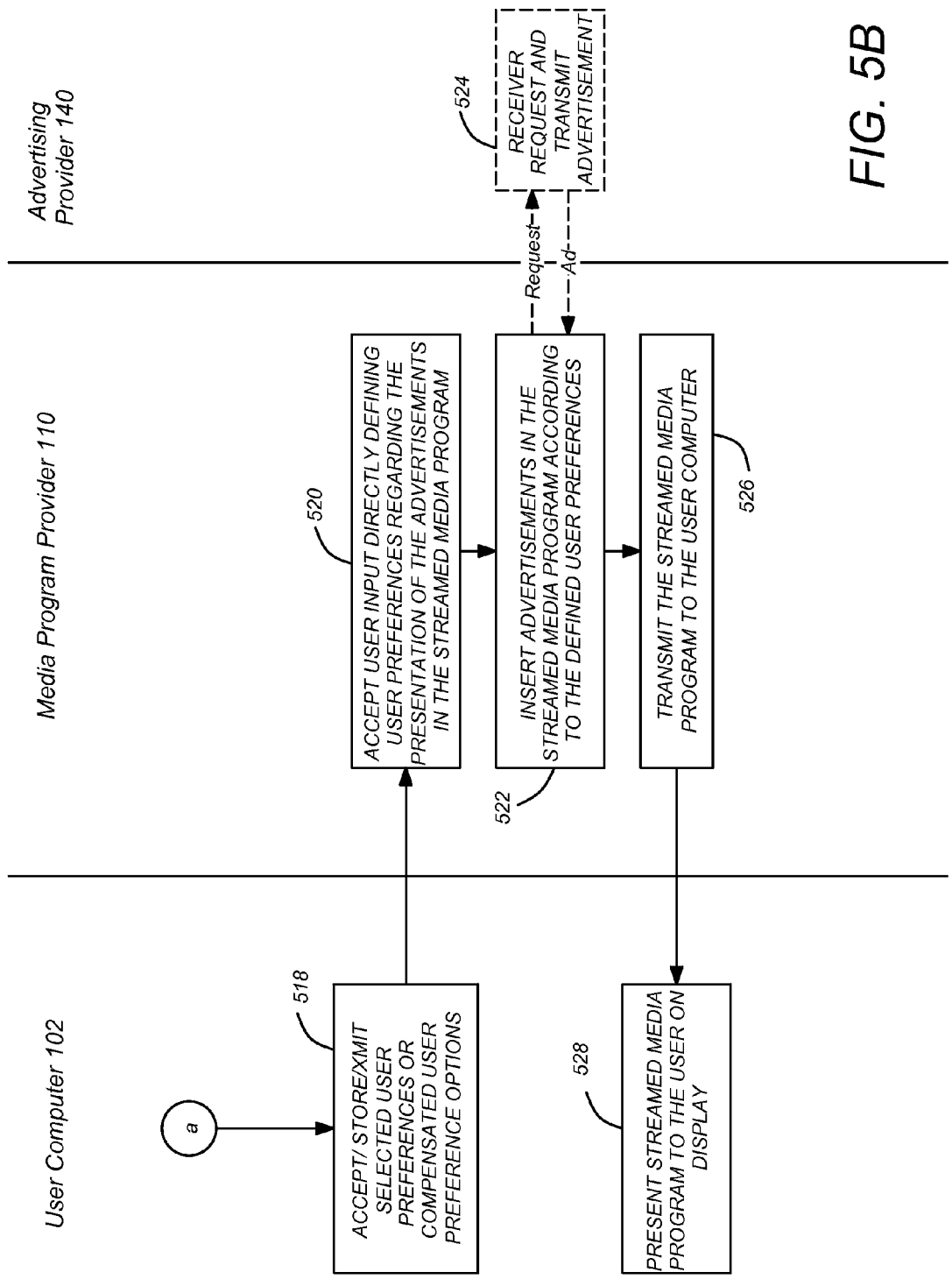

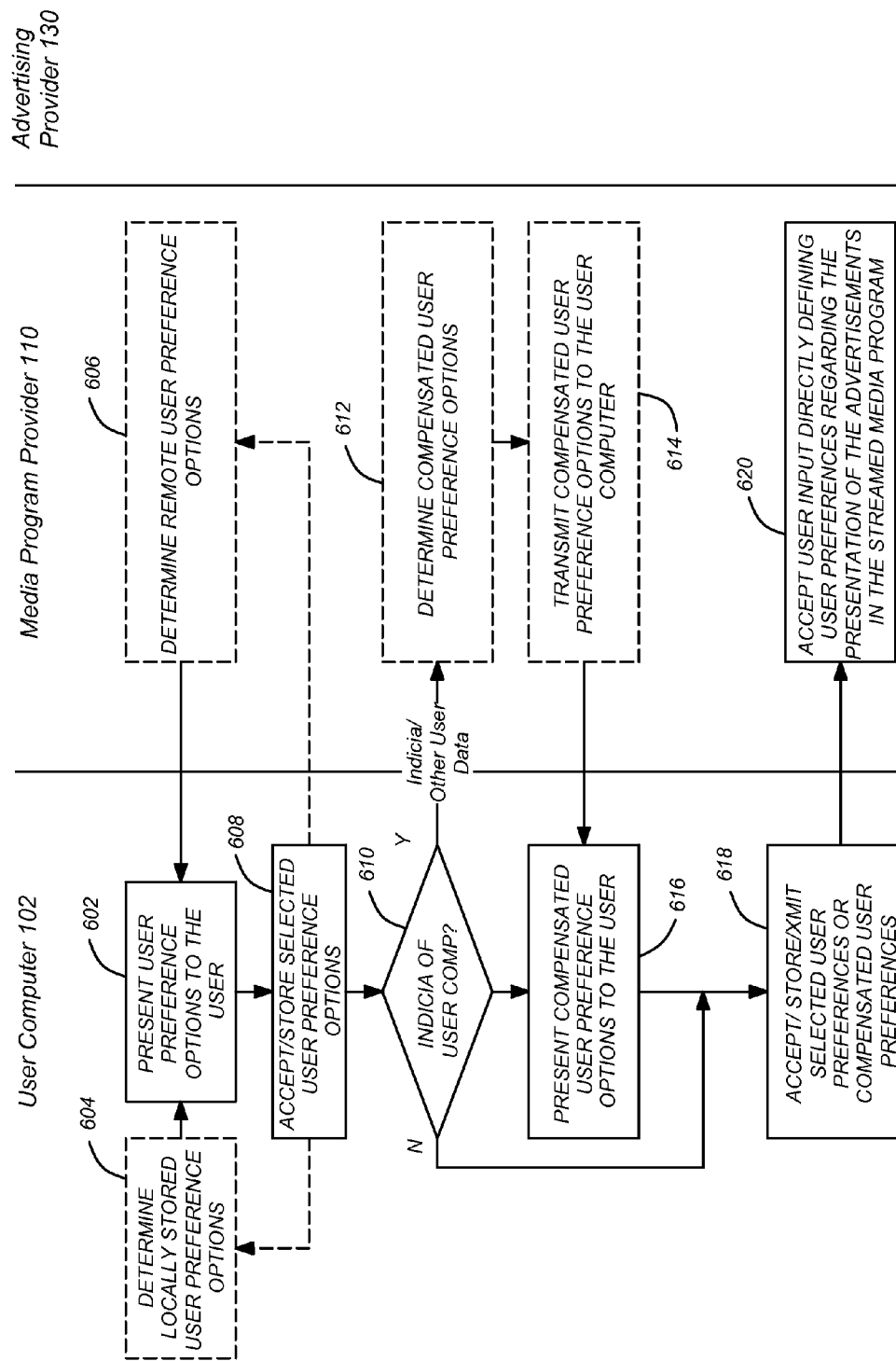

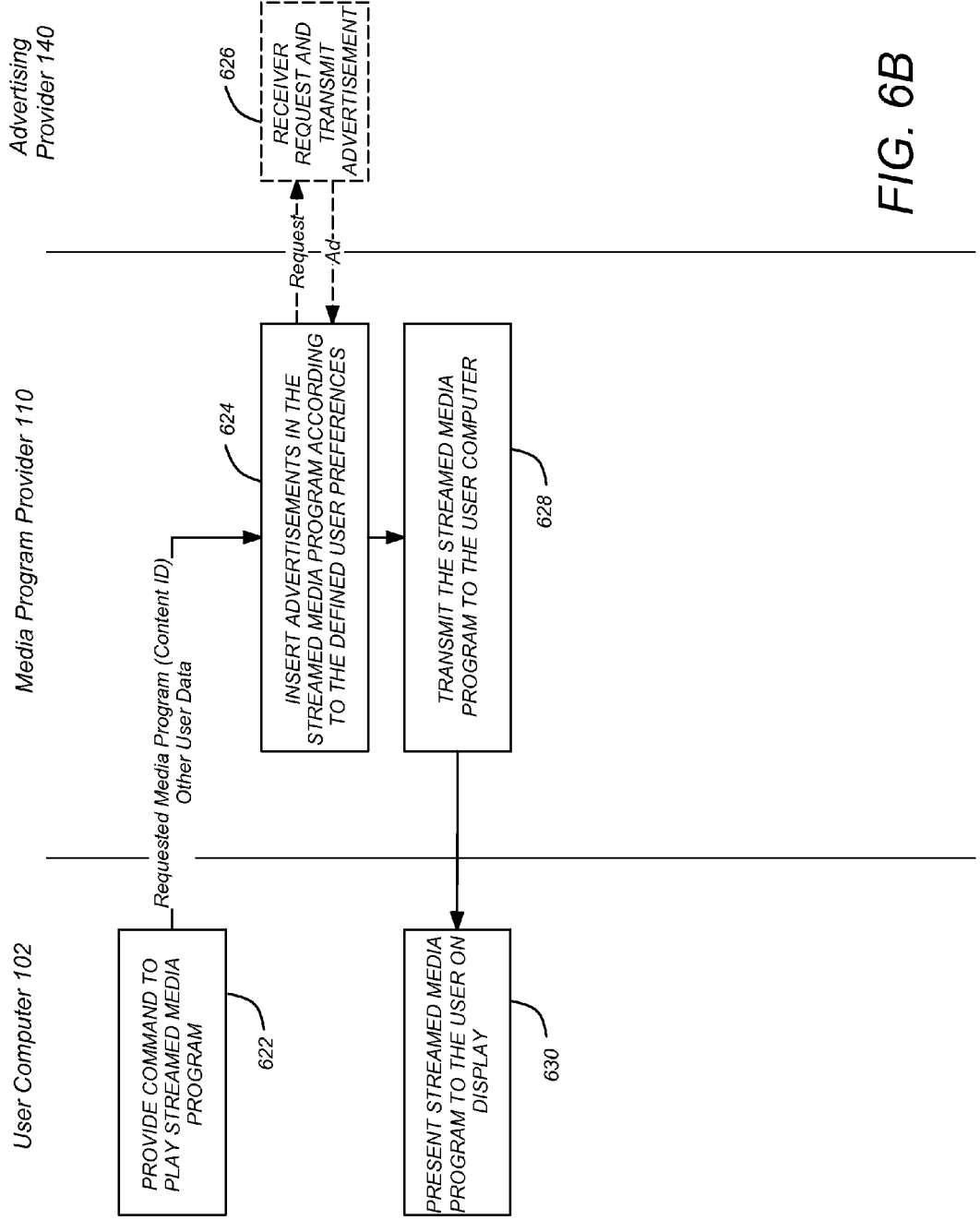

METHOD AND APPARATUS FOR COLLECTING VIEWER SURVEY DATA AND FOR PROVIDING COMPENSATION FOR SAME

CROSS-REFERENCE TO RELATED APPLICATIONS

This application is a continuation of U.S. application Ser. No. 12/627,311 filed Nov. 30, 2009, now U.S. Pat. No. 8,239,889, which is a continuation-in-part (CIP) of U.S. application Ser. No. 12/401,547 filed Mar. 10, 2009, which application claims priority pursuant to 35 U.S.C. §119(e) to U.S. Provisional Patent Application No. 61/035,243 filed Mar. 10, 2008, each of which applications are hereby incorporated by reference herein, in their entireties.

BACKGROUND OF THE INVENTION

1. Field of the Invention

The present invention relates to systems and methods for providing streaming media to users, and in particular, to a system and method for directed advertising in said streaming media.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

The delivery of media programs can be accomplished under a variety of models. In one model, the user pays for the viewing of the media program (for example, using a pay-per-view service). In another model widely adopted by broadcast television shortly after it's inception, sponsors pay for the presentation of the media program in exchange for the right to present advertisements during or adjacent to the presentation of the program.

The advent of DVRs has had a profound effect upon the advertising model described above. DVRs permit the user to record media programs (in advance or during their broadcast), and permit the user to easily bypass advertisements presented during the media program by use of trick-play functions such as fast forward and reverse.

However, DVRs are not capable of these operations with media programs provided as streaming media. In such cases, the user must view the advertisements. The fact that users cannot skip advertisements within streamed media using a DVR-like device is both a strength and a weakness of this media program delivery paradigm. It is a strength, because advertisers can be assured that the viewers are actually watching the advertisements placed within the media program and not skipping them. However, it also represents a barrier to the widespread viewing of media programs via streaming media because users prefer to skip advertisements that are not of interest.

It is also known that advertisements can be generally directed to users based on information gleaned from the user's clickstream through a website or from demographic information provided by the user. However, the information available from monitoring clickstreams often does not provide information that is important to direct advertising to the proper users. For example, household income cannot be determined from clickstream information. Further, while household income and other demographic information may be obtained from users, in prior art systems, the user is given little incentive to provide such information, and even less incentive to periodically update information that has become out of date, or to provide more detailed information.

What is needed is a method and apparatus that provides a suitable incentive for users to provide information that will permit advertisements to be directed to users who will be interested in purchasing the goods and services described in the advertisements.

SUMMARY OF THE INVENTION

To address the requirements described above, a method, apparatus, article of manufacture, and a memory structure for providing advertisements with a media program transmitted to a user computer. In one embodiment, the method comprises the steps of A method of transmitting a media program to a user computer, comprising the steps of transmitting a first message to the user computer, the first message comprising an offer to view a special version of the media program in exchange for completion of a survey, receiving a second message from the user computer, wherein if the second message indicates that the user would like to complete the survey, performing steps comprising the steps of transmitting a third message comprising the survey to the user computer, accepting and storing a fourth message comprising survey responses, and providing the special version of the media program; and if a second message indicates that the user would like to complete the survey is not received, transmitting a standard version of the media program, wherein the special version of the media program comprises fewer advertisements than a standard version of the media program. In another embodiment, a means for performing the foregoing steps is provided. This apparatus may be a media program provider computer having a processor and a memory coupled to the processor, the memory storing instructions which, when executed by the computer, cause the computer to operate as a specially programmed computer, wherein the instructions comprise instructions for performing the foregoing process.

BRIEF DESCRIPTION OF THE DRAWINGS

Referring now to the drawings in which like reference numbers represent corresponding parts throughout:

FIG. 4C is a diagram depicting an embodiment of a user interface presenting three possible advertisement choices to the user for selection;

FIGS. 5A and 5B are diagrams illustrating the acceptance and use of advertisement options in connection with the playback of a media program and illustrating possible functional allocation among the hardware elements;

FIGS. 6A and 6B are flowcharts illustrating exemplary method steps that can be used to practice an embodiment of the invention in which advertisement options are selected in advance of the playback of the media program;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
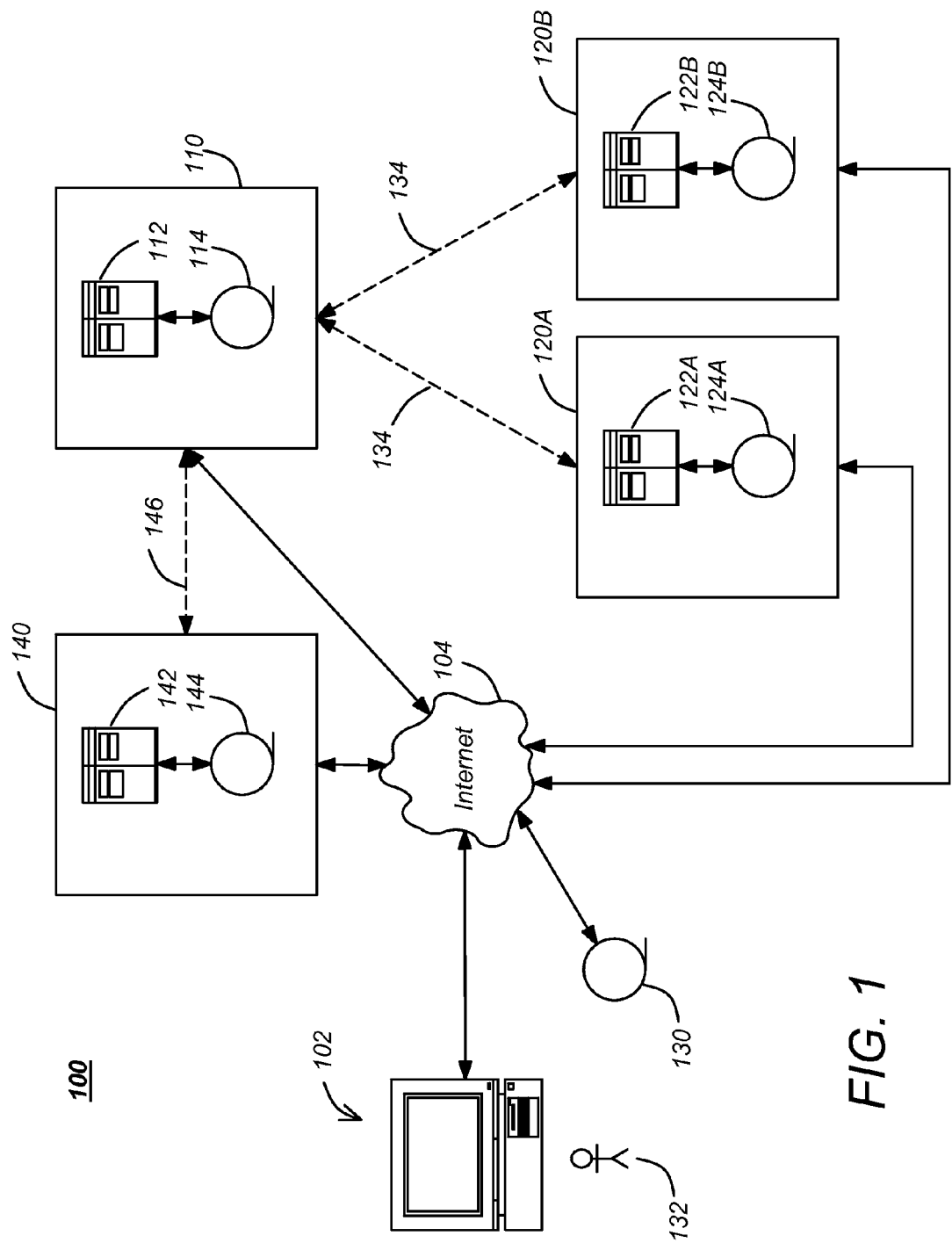
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 may stream media programs to the user's computer 102 directly from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the computer 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user computer 102 at the appropriate time.

In one embodiment, the advertisements are integrated with the streamed or downloaded video from the media program provider 110. In another embodiment, the advertisements are not integrated with the media program, but are instead transmitted to the user computer 102 separately from the media program, and replayed at the appropriate time using indices that indicate when each advertisement should be presented.

For example, advertisements can be indexed and streamed or downloaded to the user computer 102 (from the media program provider 110 or the advertisement provider 140), and such advertisements can be played back to the user 132 at times indicated by corresponding indices in the media program.

Figure 2:
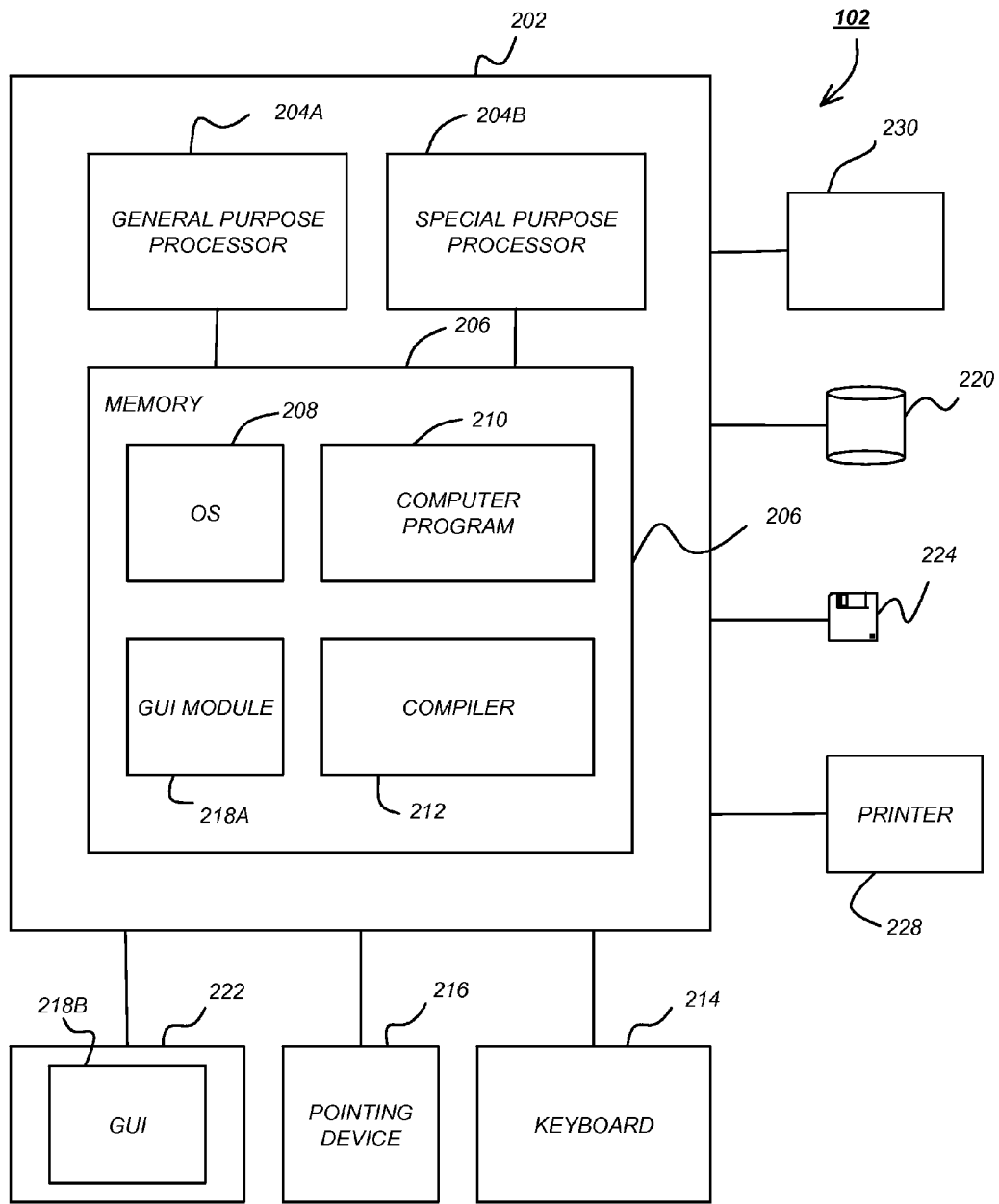
FIG. 2 illustrates an exemplary computer system that could be used to implement the present invention.

FIG. 2 illustrates an exemplary computer system 202 that could be used to implement elements of the present invention, including the user computer 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands, and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Figure 3:
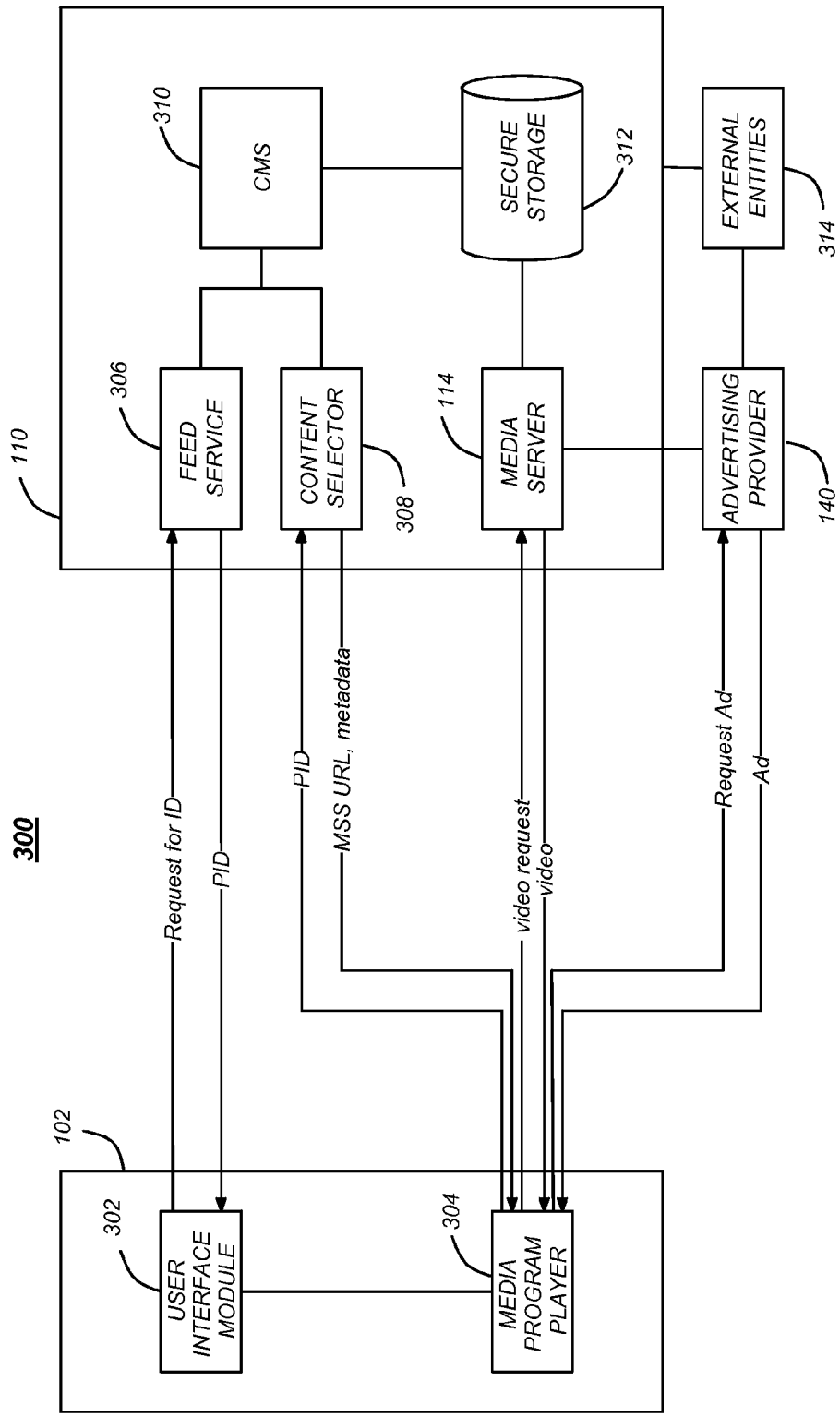
FIG. 3 is a diagram illustrating a content delivery subsystem and top-level operations that can be used to deliver media programs and advertisements for presentation to a user.

FIG. 3 is a diagram illustrating a content delivery subsystem (CDS) 300 and top-level operations that can be used to deliver media programs and advertisements for presentation to a user 132. In this embodiment, the content delivery subsystem 300 includes the user computer 102, the media program provider 110, and an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include www.hulu.com, www.imdb.com, www.aol.com or www.msn.com. Metadata related to media program and advertisement content is stored in the content delivery system 300, as is data describing where the media programs and advertisements may be found within the CDS 300.

The user computer 102 includes an interface module 302 and a media program player 304. The interface module 302 includes instructions performed by the user computer 102 that are used to present information to the user 132 and to accept user input, including commands. The presented information may include a program guide, advertisement options (as discussed further below), and the user input may include selected advertisement options and media program playback selections.

Using the user computer 102 and the interface module 302, the user 132 enters a choice for a media program. The user interface module 302 transmits a request message to a feed service 306 implemented by the media program provider 110 for a program identifier (PID). The PID is used to identify content such as a specific media program running on a specific distribution network. For example, season 2 of "The Office" running on www.hulu.com will have a different PID than the same exact show running on www.msn.com.

The feed service 306 then returns the PID to the user interface module 302. The PID and associated commands (e.g. the play command) are provided to the media program player 304. The media program player 304 may be embedded in a webpage from a third party, or may be part of a webpage maintained by the media program provider 110, or may be implemented in a standalone application.

The media program player 304 transmits the PID to a content selector 308 implemented by the media program provider 110. The content selector 308 identifies the actual path (uniform resource locator or URL, for example) to the requested media program associated with the transmitted PID, as well as programming metadata that is used by the media program player 304 to help identify restrictions (for example, preventing access to adult-themed content if the user 132 is known to be under 18), advertising targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 304. The media program player provides a video request to the media server 114 at the URL received from the content selector 308. The video request includes the PID and may include other information as well. The video request may be for streaming or progressively downloading the requested media program.

The media streaming server (MSS) 114 responds to the video request by providing the media program to the user computer 102. In one embodiment, the MSS 114 is a service provider that has a wide range of geographically distributed computers that store replicated copies of media programs and website content. The MSS 114 can be a third party provider (e.g. only contractually associated with the media program provider 110), or can be part of the media program provider 110. Geographically diverse servers assures that when the user 132 requests playback of a media program, the media program is streamed from a geographically local server, to increase media program playback performance. Multiple servers also offer redundancy.

The MSS 114 obtains the media program from secure storage 312 which may be disposed in the media program provider 110 facility, or which may be disposed at a third party facility. The content management service 310 interfaces with the feed service 306, the content selector 308, and secure storage 312 to manage which media programs are provided to the media server 114. External entities 314 can include third parties such entities that provide the advertisements that are to be displayed to the user (which includes sponsors and/or their advertising agencies), third party providers of media programs, and entities from which the user 132 may purchase goods or services as further described below.

The media program is transmitted to the media program player 304. As described above, the media program may be streamed or progressively downloaded to the media program player 304. In one embodiment, the media program player 304 plays the media program, and at the times identified in the advertising breaks defined above, requests advertisements from the advertising provider 140 using a path (e.g. URL) provided either by the content selector 308 or the media streaming server 114. The advertising provider 140 streams the requested advertisement is streamed to the media program player 304 at the appropriate time, where it is displayed to the user 132. In another embodiment, the media server 114 obtains the advertisements from the advertising provider 140 and inserts the advertisements in the media program before the media program is streamed or progressively downloaded to the media program player 304.

Figure 4A:
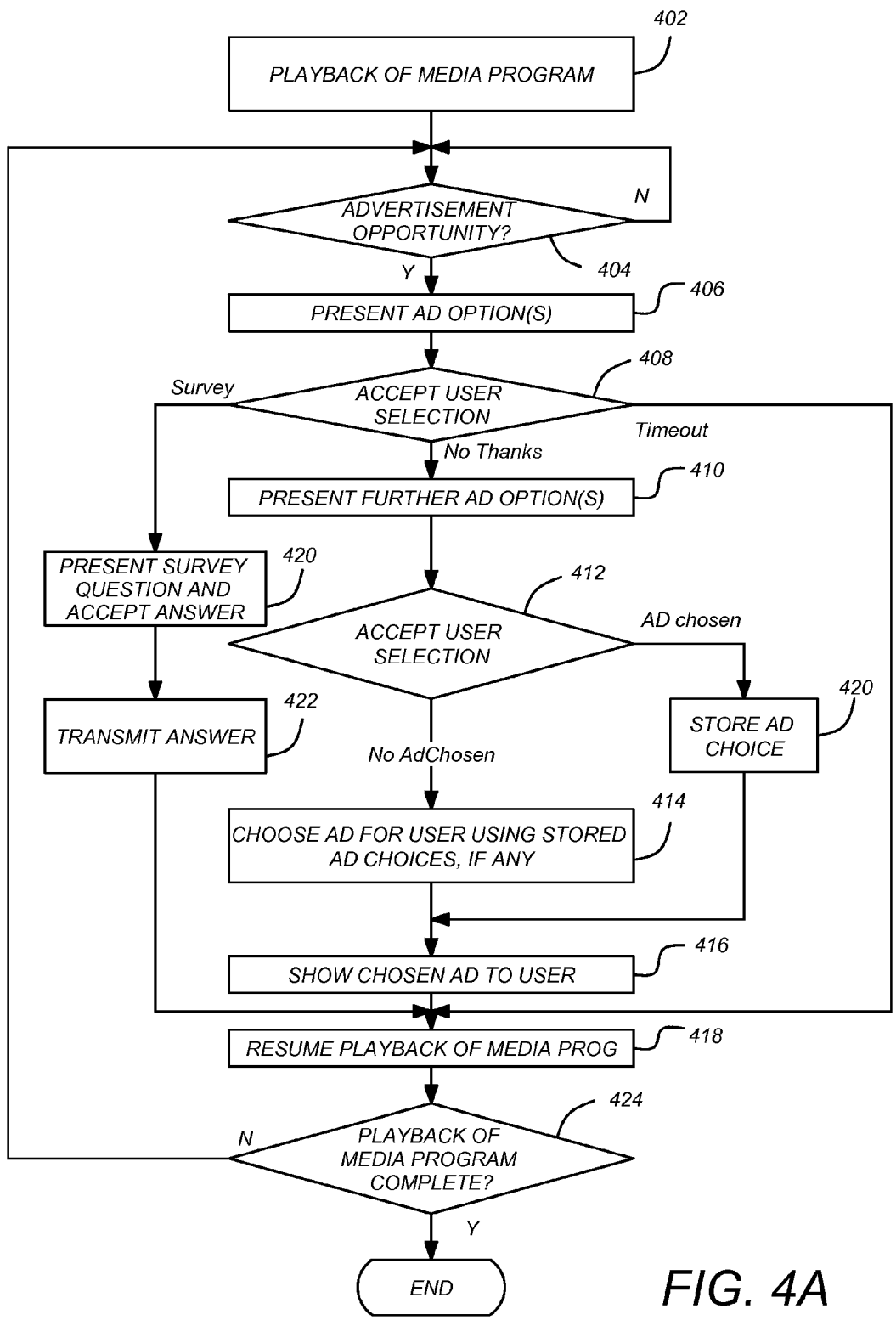
FIG. 4A is a diagram illustrating exemplary method steps that can be used to insert advertisements into a media program, wherein the advertisement choices are made while the media program is being played.

FIG. 4A is a diagram illustrating exemplary method steps that can be used to insert advertisements into a media program. In block 402, the playback of a media program commences. Block 404 determines whether there is an advertisement opportunity during the playback of the media program. In one embodiment, the advertisement opportunity is determined using the advertising breaks described above.

Block 406 presents advertising options to the user 132. The advertising options may be a simple matter of directly selecting which advertisements the user 132 wishes to see, whether the user wishes to answer one or more survey questions to skip the advertisement and continue watching the media program, or more complex advertising options may be presented for selection.

In the embodiment illustrated in FIG. 4A, the user 132 is presented with the option of answering one or more survey question(s) in exchange for the user reward of skipping the advertising break and continuing playback of the media program, as shown in block 406. In block 408, the user's selection is accepted. If the user elects to answer the survey question, the survey question is presented, and the answer is transmitted to the MPP 110, as shown in blocks 420 and 422. Playback of the media program is resumed, as shown in block 418.

Figure 4B:
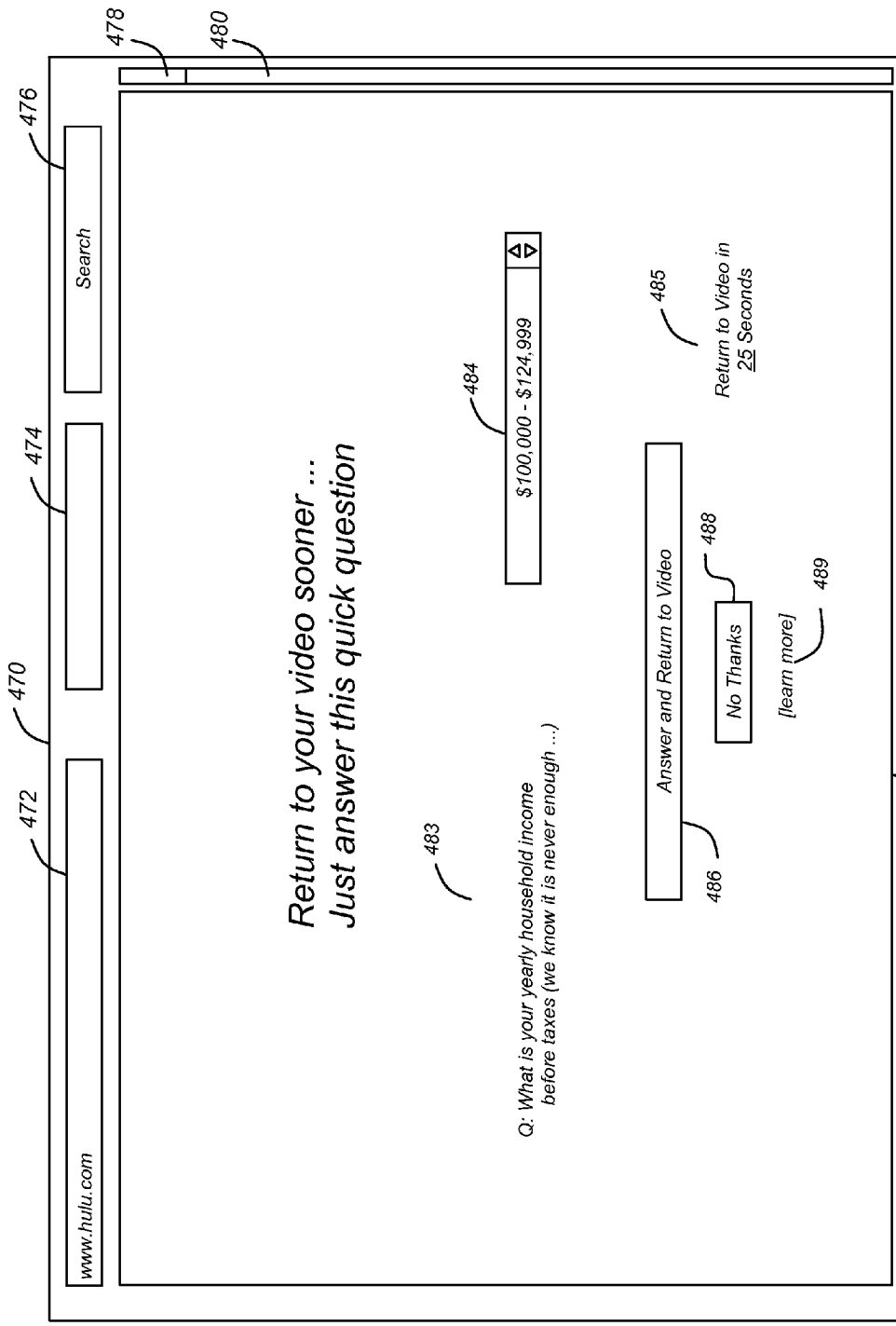
FIG. 4B is a diagram illustrating an exemplary user interface presenting advertising options.

FIG. 4B is a diagram illustrating an exemplary user interface presenting advertising options. In this illustrated embodiment, the user interface comprises a browser 470 presenting window 482 on the display 222. The browser 470 may include an address box 472, allowing the user to enter a URL of a desired website, a search input box 474, a search control 476, a scroll bar 480 and scroll tab 478. The user may perform a search of the Internet for websites of interest by entering keywords in the search box 474 and selecting the search control 476. The user may also navigate webpages extending beyond the display by manipulation of the scroll tab 478 along the scroll bar 480.

The window 482 presents a survey question 483 and an input control 484 for entering an answer to the survey question 482. In the illustrated embodiment, the input control 484 provides a means for selecting one of a plurality of possible answers. The user 132 selects the answer by selecting the input control 484 and depressing the answer control 486. If the user 132 would like more information regarding the survey, the question, or how the question is used, they can select the "learn more" control 489.

In one embodiment, a timer 485 is presented to indicate that the user has a period of time to respond to the offer to answer the survey question. The timer 485 presents the time remaining before the automatic action is taken. In one embodiment, if no input has been received when the timer 485 reaches zero, the processing returns to the playing of the standard version of the media program (e.g. with the advertisement(s)). In another embodiment, processing plays the special version of the media program (e.g. with fewer advertisement(s)).

If the user 132 selects the "No Thanks" control 488 shown in FIG. 4B, or if the timer 485 runs out, the user may be presented further ad options, including the option of choosing which advertisement to view, as shown in block 410.

FIG. 4C is a diagram depicting one embodiment of a user interface 494 presenting three possible advertisement choices to the user for selection: an advertisement for a minivan, one for sport utility vehicle (SUV) and one for a sports sedan. Each advertisement choice includes an icon or illustration 490A-490C, and a selection control 492A-492C that can be used to select the desired advertisement. The advertisement selections can represent products or services from one vendor (e.g. a GENERAL. MOTORS minivan, SUV and sports sedan) or products and services from multiple vendors (e.g. a minivan, SUV or sports sedan from any vendor). A second user interface may be presented with further options to refine the user's advertisement choice, if desired. For example, if the user selected a minivan advertisement, another window may be presented asking the user to choose between several different minivan manufacturers.

Block 412 determines whether the user 132 has made a selection. If no advertisement(s) were chosen, processing proceeds to block 414, where an advertisement is chosen for the user 132 using previously stored choices or other factors such as user profiles, or user viewing preferences or histories. If one or more advertisements were selected, the selection is stored for later use, both to play the selected advertisement, and in one embodiment, to select advertisements in the future when none are selected or if an insufficient number are selected. This is illustrated in block 420.

In block 416, the chosen advertisements are transmitted to the user computer 102 and shown to the user 132. In one embodiment, if the user 132 only selected N advertisements and there were N+1 advertising slots in the advertisement break, further advertisements are chosen for streaming and presentation to the user 132 for these unchosen advertisement slots. Such advertisements can be chosen using previously stored choices or other factors such as user profiles or viewing preferences or histories.

Block 424 determines whether the playback of the media program is complete. If it is not complete, processing returns to block 404 to await another advertisement opportunity. If playback is complete, processing of the current media program ends.

The present invention need not be implemented such that the commencement of the media program begins before the advertisement selections are made. In one embodiment, the advertising options are presented to the user 132 in advance of the selection, and/or commencement of the playback of the media program.

The foregoing illustrates an embodiment in which the user is provided compensation in the form of advertising-free viewing in exchange for completing a survey. However, compensation may be provided in other forms. For example, the user may be offered reduced advertising (shorter, fewer, or different ads) or may be offered an opportunity to view another media program that is offered only to survey respondents or those that pay for it. Further, the viewer may be offered other choices such as a choice between watching one or more trailers or advertisements before viewing a media program, or becoming a registered user (e.g. by answering a series of questions provided in the registration process). Users may also be provided with different options depending on user loyalty (e.g. how much or often the user views media programs from the provider) or depending on user preferences provided in the registration process.

Figure 5A:
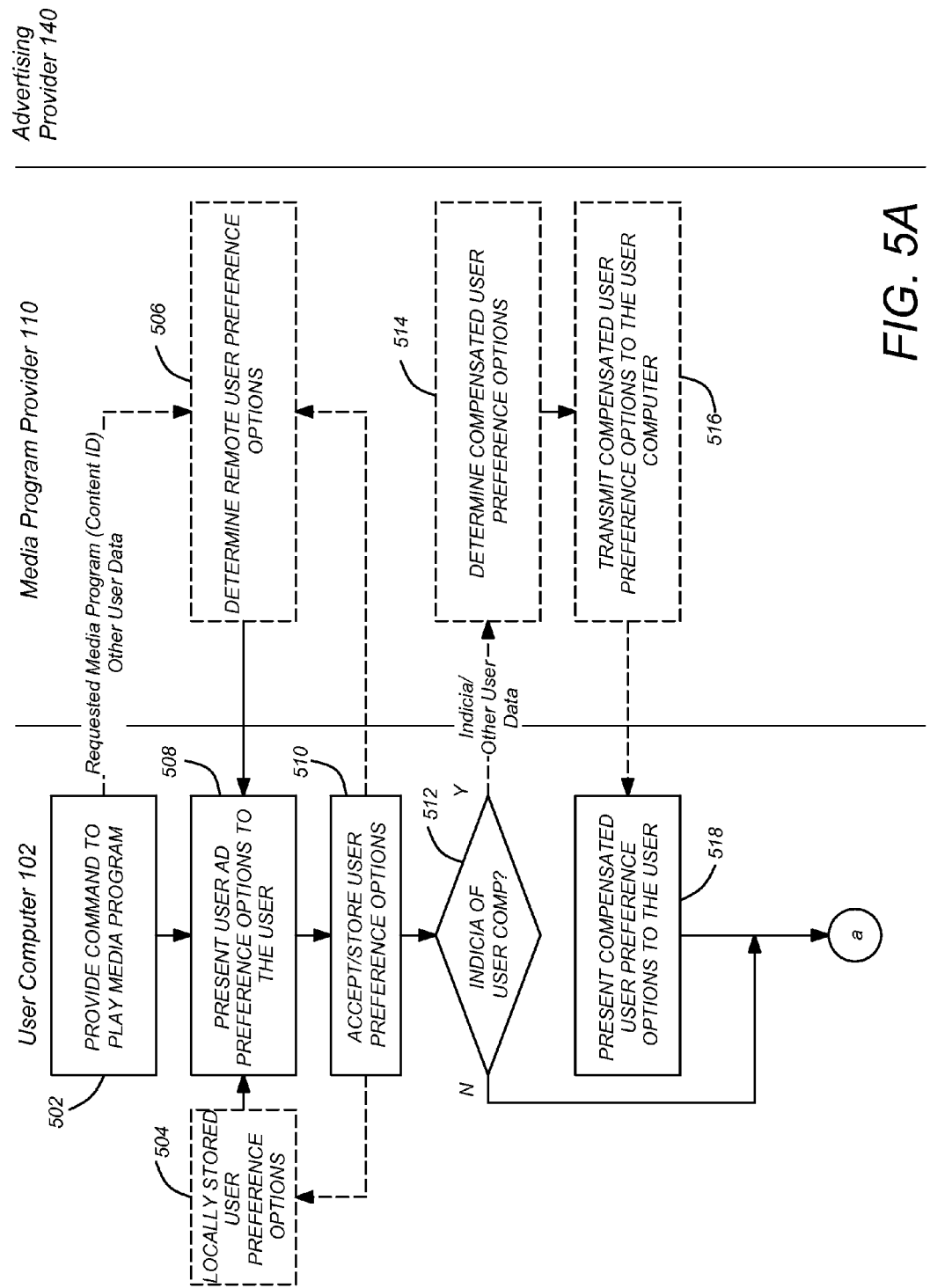

FIG. 5A is a diagram illustrating further embodiments and details regarding the acceptance and use of advertisement options in connection with the playback of a media program, illustrating possible functional allocation among the hardware elements. The user computer 102 accepts a command from the user 132 to play a media program, and the user computer 102 provides the command to the media program provider 110, as shown in block 502. In one embodiment, the command to play the streamed media program is accepted by the feed service 306, which returns a program identifier (PID) that is later used to retrieve the selected media program. In another embodiment, the PID for multiple media programs that are available is transmitted to the user computer 102 in advance as a part of a program guide.

In block 508, user advertisement preference options are presented to the user 132 by the user computer 102. The information for presenting such options can be locally stored (e.g. in a memory of the computer 102 as shown in block 504), or they can be stored by the media program provider 110 or third party (as shown in block 506) and transmitted to the user computer 102 when needed, and presented to the user 132 for selection.

The advertisement options presented can include any combination of the following:

Presenting which Advertisements the User 132 can View in the Current Commercial Break:

The advertisements can be presented via a named list, icons, or thumbnails that can be presented on the display 222 and selected by the user 132 using pointing device 216 or keyboard 215. In one embodiment, the options presented are selected based upon either information about the user 132 that is provided either via an independent interface, survey responses, from previous advertisement selections, from a third party 314 database, the media programs selected by the user 132 to be played (which can be identified by metadata associated with the media program), or from a history of media programs that the user has played in the past.

For example, the user 132 may be presented with list showing a SNICKERS bar, a LA-Z-BOY recliner, and NETFLIX if the previous user 132 advertisement selections or survey responses indicated that the user 132 was interested in these products or if the user 132, based on the current program viewed or the user's history of program viewing, survey information, or other information, was thought to lead a lifestyle in which such products or services were desirable (e.g. a sedentary lifestyle). If previous advertisement selections, the current program being viewed, the user's viewing history and/or survey information indicated that the user 132 would likely be interested in different advertisements, other advertisement options may be shown. For example, if the currently viewed media program is of the TOUR OF CALIFORNIA, the viewer may be presented with a list showing a CLIF bar, a KOOBI bicycle seat, and a SPINERVALS video.

In another embodiment, the advertisement options presented to the user 132 include different combinations of groups of required and elective advertisements. Required advertisements are those that must be viewed by the user 132, while elective advertisements are those over which the user 132 has a choice. For example, if the user profile indicated that the user 132 was an avid bicyclist, the advertising options presented could include a list of advertisements from an elective group (e.g. advertisements having to do with cycling products or services) and a list of advertisements from a required group (for example, having to do with detergents or other staples that virtually everyone needs). In another embodiment, the advertisements presented to the user 132 can include required advertisements (the presentation of which the user 132 has no control) and elective advertisements (the presentation of which the user 132 has control). In this embodiment, the fee charged to the source of the goods or services described in the advertisement may be charged a different fee for required advertisements than elective advertisements).

The user 132 may select one or more of the optional advertisements provided, and these are the advertisements that will be shown during the advertisement break. As described above, the identity of the selected items (as determined by a PID or analogous value) can later be used to refine future advertisement selections that are presented to the user 132. In one embodiment, the identity of the selected items is transmitted external to the user computer 102 (for example, to the media program provider 110, to the advertising provider 140 or a third entity) for purposes of further refining the advertising choices that are offered to the user 132. In another embodiment, the identity of the selected choices is held internal to the user computer 102 and not disclosed elsewhere. This embodiment increases the privacy of the user's 132 information. In yet another embodiment, a subset of the viewer information is transmitted external to the user computer 102, and other information is held secure within the user computer 102. The information or subset of information can be processed by the user computer 102 so as to be insufficient to identify the user 132 by removing any information identifying the user 132, and instead, linking the user selections to user demographics such as age, sex, income, and residence or user viewing history.

Presenting which Advertisements the User 132 can View in Future Commercial Breaks:

The options presented to the user 132 may include advertisements for more than just the current commercial break. For example, the user 132 may be asked to select all of the advertisements that will be presented during the media program, for all commercial breaks or for the viewing session. Further, as described below, advertisement selections can be made in advance of the play of the media program, or during the media program.

Presenting Categories of Advertisements to the User 132: In this embodiment, the user 132 is presented with different categories of advertisements. In one embodiment, the categories offered to the user 132 become more specific as the user 132 makes advertisement choices of provides other information. For example, initially, the categories offered may be broadly described as "Home," "Auto," and "Outdoors", but if the user's choices indicate that the user 132 is more interested in the outdoors, the categories presented may be changed to sub-categories within the "Outdoor" category, such as "Winter Sports," "Summer Sports," and the like.

Presenting Options Controlling How the Advertisements are Presented in the Media Program: In another embodiment, the user 132 is presented with options describing how the advertisements are presented in the media program. These options may describe the timing of the presentation of the advertisements. In this case, subsets of advertisements can be provided in advertising blocks, and the user 132 can be given the option of expressing a user preference to describe the number and/or temporal distribution of advertisements to be presented in each block and the temporal distribution of the advertisement blocks within the streamed media program. For example, the user 132 may be required to view all of a set of advertisements, but given the option of seeing them widely dispersed throughout the media program (for example, inserting two 30 second advertisements every 5 minutes rather than six 30 second advertisements every 15 minutes). Using this option, the user 132 may elect to view all of the advertisements in the beginning, the end, or in the middle of the media program, or the user 132 may elect to view the advertisements spread out over the length of the media program. Recognizing that the user 132 is less likely to remain seated and watch commercials that are presented during extended commercial breaks, the options presented to the user 132 may limit the user's control so that each commercial break must include at least n commercials and no more than m commercials, with typical values of n and m being 2 and 8, respectively.

The sponsor of the advertisement (the entity ultimately paying the media program provider 110 or associated entity for providing the media program and/or advertisement to the user 132) can be charged for the presentation of one or more of the advertisements an amount that is based on how the advertisement is to be presented in the streamed media program. In this embodiment, the sponsor can specify a timing structure that limits the user's options in determining when the advertisements are presented, or the sponsor may simply be charged differing amounts based upon when the user 132 decides to present the advertisement. For example, the sponsor may be asked to pay more for an advertisement that is the first in a block of advertisements in an advertising break, or at times when the user 132 is more likely to view the advertisement.

The presented options may optionally include how the advertisements are presented in the viewer space. For example, the user 132 may be presented with the option of viewing the commercial on a pop-up window, a smaller wide window, or optionally, with muted or reduced audio.

In block 510, the selected user preference options are accepted and stored. The selections can be locally stored in the user computer 102 or transmitted to and stored by the media program provider 110. As described above, the selected user preference options can be later used to determine which advertisement options to present to the user 132, or to determine which advertisements to present when the user 132 has not selected which advertisements they would like to be streamed along with the media program.

In one embodiment, the user 132 is provided with different (and optionally, preferential) advertisement options if the user 132 agrees to provide some kind of user compensation. Such user compensation can include the registration of the user, the taking a survey, the purchase of the media program that is streamed or progressively downloaded to the user computer 102 or the purchase of a product and/or service independent from the presentation of the media program. In other words, different user advertisement preference options can be provided if the user 132 has provided compensation by paying for the playback of the media program, or if the user 132 has provided some compensation unrelated to the playback of the media program. For example, the user 132 may want to view a media program such as a movie, and want to view the movie either with few advertisements or none at all. In such a case, the user 132 is provided with the option of providing compensation for this privilege.

The compensation can take the form of the user 132 providing personal profile or survey information about themselves and/or their viewing habits, ordering a product, completing a survey, or ordering a service. In the example of a user 132 wanting to view a media program without any advertisements, this can be accomplished by ordering a pizza, groceries, or any product or service from an authorized source, whether or not the source has any connection whatever to the chosen media program. In this situation the media program provider 110 may be compensated by the source from which the order was made, in the form of a percentage of the gross value of the sale, the profit of the sale, or by a fixed fee. Consequently, any user 132 desirous of viewing media programs without advertisements need only order their groceries (for example) using the media program provider 100. Another form of user compensation is the providing of services (such as advertising services) to the user or the user's designee at reduced prices or without charge. For example, if the user wants to support a charity such as CORAZON (www.corazon.org), they can designate as such, and the charity is provided the compensation instead of the user. For example, the designated beneficiary of the user compensation can be provided free advertising comprising a given number of views (known as charitable impressions), clickthroughs, or advertisements.

The purchase options presented to the user 132 may include only those which are related to the content of the selected media program (as determined by metadata associated with the selected media program), or may include products and services unrelated to the selected media program. The purchase options presented to the user 132 may include products and/or services from vendors who are in a pool of advertisers whose advertisements are shown using the CDS 300. Alternatively, the purchase options presented to the user may include products and/or services from vendors who are not advertisers (e.g. advertisements for the providers are not among those that can be presented to the user). A provider may join a group of product and service providers that wish to be listed as approved vendors that the user may order products and services from in order to obtain preferential advertisement options. For example DOMINO'S PIZZA may not wish to present advertisements using the foregoing system, but may wish to offer users the opportunity to view a media program without advertisements if the user 132 orders a pizza. The pizza order can be made on-line using the Internet 104, or can be made using an ordinary telephone, by providing the appropriate information to the vendor. For example, the vendor may be given a code comprising series of alphanumeric characters that entitle the bearer to compensated user options. When the user 132 orders the goods or service, they may be given the alphanumeric. The user 132 may enter the alphanumeric in the user interface in order to obtain the compensated user preference options. The price paid by the vendor for this feature may be a percentage of the sales or profits derived from the ordered product of service, or a flat fee.

The compensated user preference options may be available for a limited time, as determined by the media program provider 110 or the advertiser. For example, in the DOMINO'S PIZZA example above, the user 132 may be provided the compensated user preference options for a period of 24 hours after ordering the pizza.

In one embodiment, the providers of the products and services which may be ordered by the user 132 pay for the privilege of being included in the list of product of service providers that the user can choose from. In another embodiment, the providers of the products pay only when a user orders a product of service from the provider. In still another embodiment, the provider pays a fee for being included in the list that the user 132 can choose from and an additional fee is charged when the user orders a product or service from the provider.

In one embodiment, the user compensation is requested and provided after the user makes a request to view the media program. In other embodiments, the user may provide the compensation (for example, providing survey answers or ordering a product) before a request for the media program has been made. In such embodiments, the user can accumulate points for compensation provided by the user, and such points can be used to view media programs with fewer or no advertisements. Points may be valid for a period of time only, or may be valid until used. Points may also be managed by the user according to a user interface, indicating the points accumulated by the user.

The foregoing functionality is illustrated in blocks 512-518 of FIG. 5A. Block 512 determines whether the user 132 has provided compensation, for example, by making the appropriate selection of user ad preference options. An indicia of the provided compensation (which identifies the compensation provided and the user 132 providing it) is then provided to the media program provider 110 or an external entity such as the advertiser or vendor of the product or service ordered by the user. These operations are shown in block 512. In blocks 514 and 516, the media program provider 110 determines the compensated user preference options and transmits them to the user computer 102 to be presented to the user 132. The compensated user preference options can include a selection of advertisements differing from those presented to users not providing compensation, different options regarding how the advertisements are presented in the streaming media program, or an option of having no advertisements at all.

Turning to FIG. 5B, the selected user preferences or compensated user preferences are accepted, stored and transmitted to the media program provider 110, as shown in block 518. If necessary, the MPP 110 also transmits information to the advertiser or source of goods or services to indicate that the goods and services have been ordered. The media program provider 110 accepts the user 132 input defining the user preferences regarding the presentation of the advertisements in the streamed media program, as shown in block 520. In one embodiment, the user input directly defines user preferences regarding the presentation of advertisements in the media program.

In this context, user input "directly defining" is to be distinguished from indirect user input that can be used to identify appropriate advertisements. For example, it is known to monitor a user's clickstream to determine which advertisements are supplied to a user 132 within webpages. However, while the clickstream may indirectly define which advertisements are presented, it does not define which advertisements are presented during a presentation of the media program and does not directly define the advertisements that are presented. At best, in this case, the user's desires regarding advertisements are inferred from the clickstream, they are not directly provided. One example of direct definition of advertisement preferences is the case where the user 132 is provided with a list of advertisements, and allowed to choose which advertisements of those on the list they would like to view. Another example of direct definition of advertisement preferences is indicating how the advertisements are to be temporally presented.

Given the provided user preferences, the media program with the inserted advertisements are provided to the user computer 102. This can be accomplished as shown and described with reference to FIG. 3 (in which the media program with advertising breaks is provided from the media program provider 110 and the user computer retrieves the advertisements) or as shown in FIG. 5B, in which the media program provider 110 retrieves the advertisements (either from storage in the media program provider 110 itself or through advertising provider 140) and inserts those advertisements in the streamed media program before providing it to the user computer 102 for display, or a combination of both (e.g. some advertisements being retrieved inserted by the MPP 110 and others being obtained by the user computer 102 from the advertising provider 140 at the appropriate advertising breaks). As shown in block 522, this includes inserting advertisements in the media program according to the user defined preferences, and transmitting the media program to the user computer as shown in block 526.

Embodiments where the media program provider 110 inserts the advertisements in the media program stream before transmission to the user computer are advantageous in that the media program provider 110 retains control over the presentation of the streaming media, making it more difficult for modifications in the software of the user computer 102 to circumvent the retrieval and presentation of advertisements. With this technique, the media program provider 110 requests advertisements that comply with the defined user preferences, and receives the appropriate advertisements from the advertising provider 140. These advertisements are inserted into the streamed media according to the user-defined preferences and transmitted to the user computer 102 where they are presented on a display.

The media program with the inserted advertisements is then played for the user on the user computer 102 as shown in block 528.

FIGS. 6A and 6B are flowcharts illustrating exemplary method steps that can be used to practice an embodiment in which the user preference options are presented to the user 132 before the media program playback is requested. Turning to FIG. 6A, in block 602, user preference options are presented to the user 132. As before, such options can be locally stored (as shown in block 604) or stored remotely (as shown in block 606). The selected user preferences are accepted and stored, as shown in block 608.

Next, in embodiments that include provision for compensated user preferences and options when the user 132 provides compensation, block 610 determines if an indicia of user compensation was entered by the user 132. If so, compensated user preference options are determined and transmitted to the user computer 102 and presented to the user 132, as shown in blocks 612-616. The user computer 102 accepts, stores, and transmits user preferences or compensated user preferences, and transmits them to the media program provider 110 as shown in block 618. The media program provider 110 then accepts the user input directly defining user preferences regarding the presentation of the advertisements in the streamed media program as shown in block 620.

Turning to FIG. 6B, a command is provided to play a streamed media program, as shown in block 622. The request is transmitted to the media program provider 110. In the embodiment illustrated in FIG. 6B, the media program provider 110 inserts advertisements in the streamed media program according to the defined user preferences and transmits the streamed media program with the advertisements to the user computer 102 for presentation, as shown in blocks 624 and 628. However, as described above, this can be accomplished using a different paradigm wherein the media program provider 110 transmits the streaming media program and identifies the advertising breaks and the user computer 102 retrieves the advertisements directly from the advertising provider 140. Finally, the streamed media program is presented to the user 132 on the display 222.

It is advantageous to identify the user 132 of the user computer 102, rather than the user computer 102 itself (since one user computer 102 may provide service to multiple users 132 with different viewing habits and preferences). However, the present invention may be practiced by identifying the user computer 102 rather than the user 132. This can be accomplished by an ID associated with the computer (such as a processor ID, or through the IP address assigned to the computer.

Figure 7A:
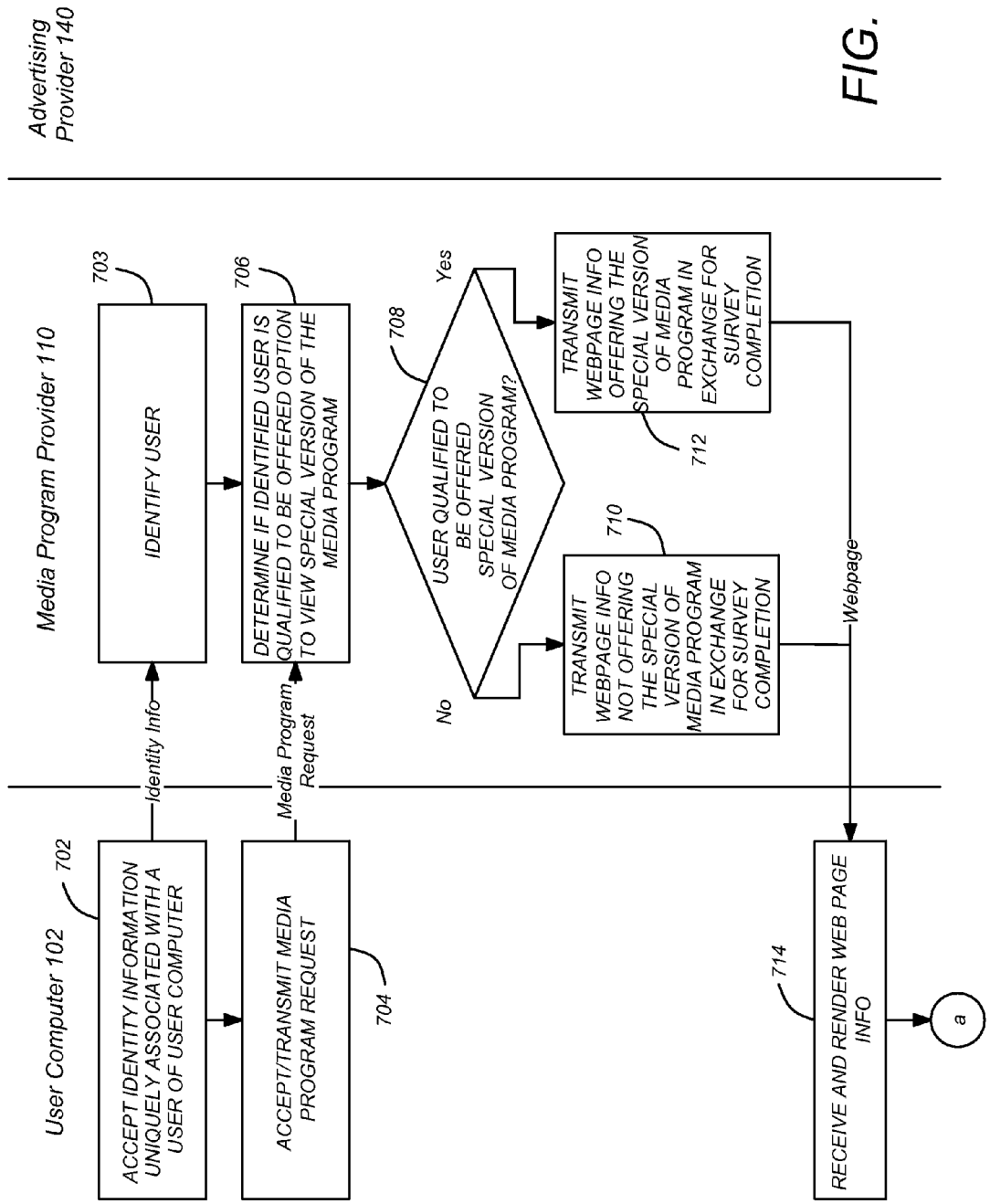
FIGS. 7A-7C are diagrams presenting further detail regarding how a user may be permitted to view the media program with reduced or zero advertisements in exchange for providing compensation in the form of answers to a survey.
Figure 7B:
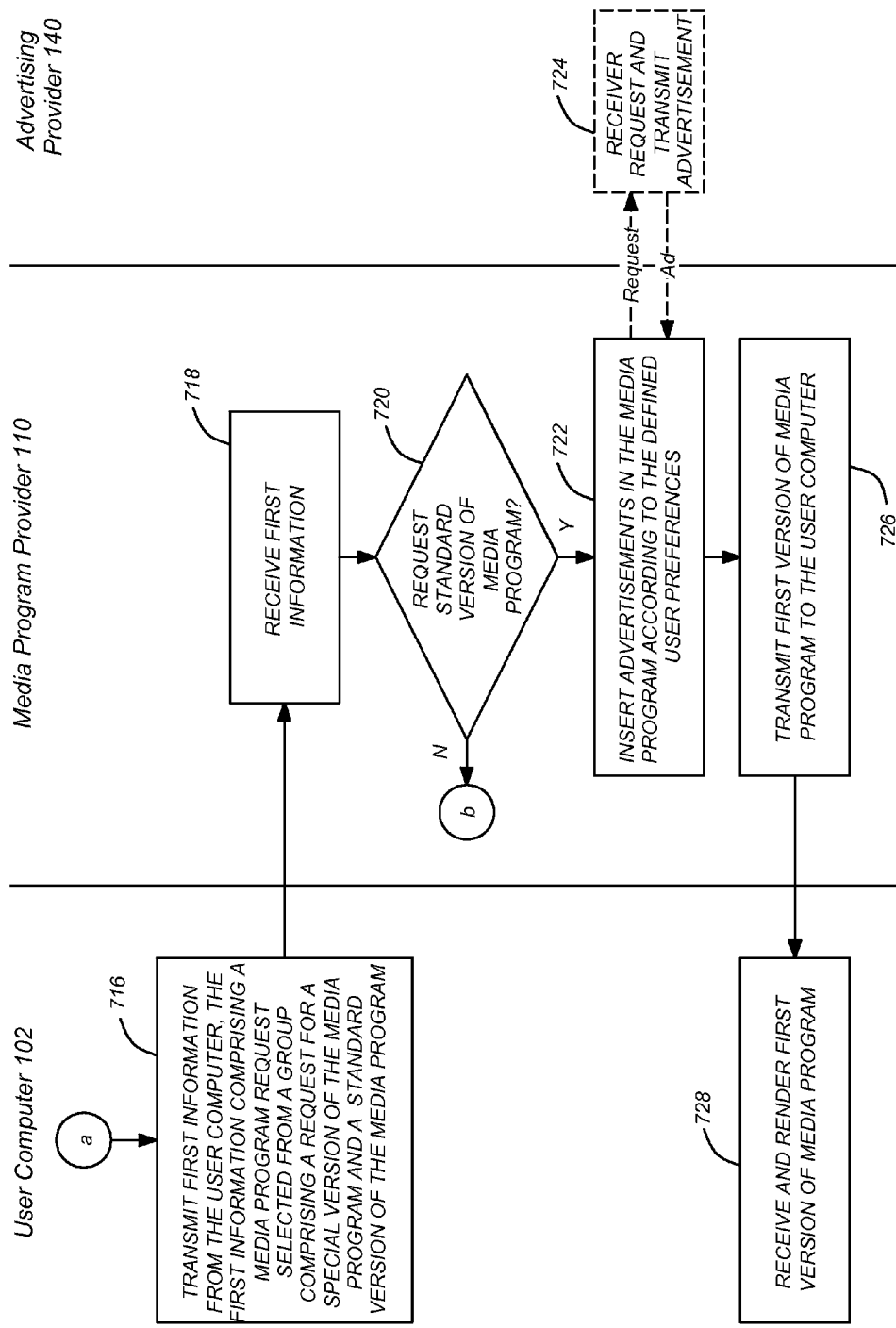
Figure 7C:
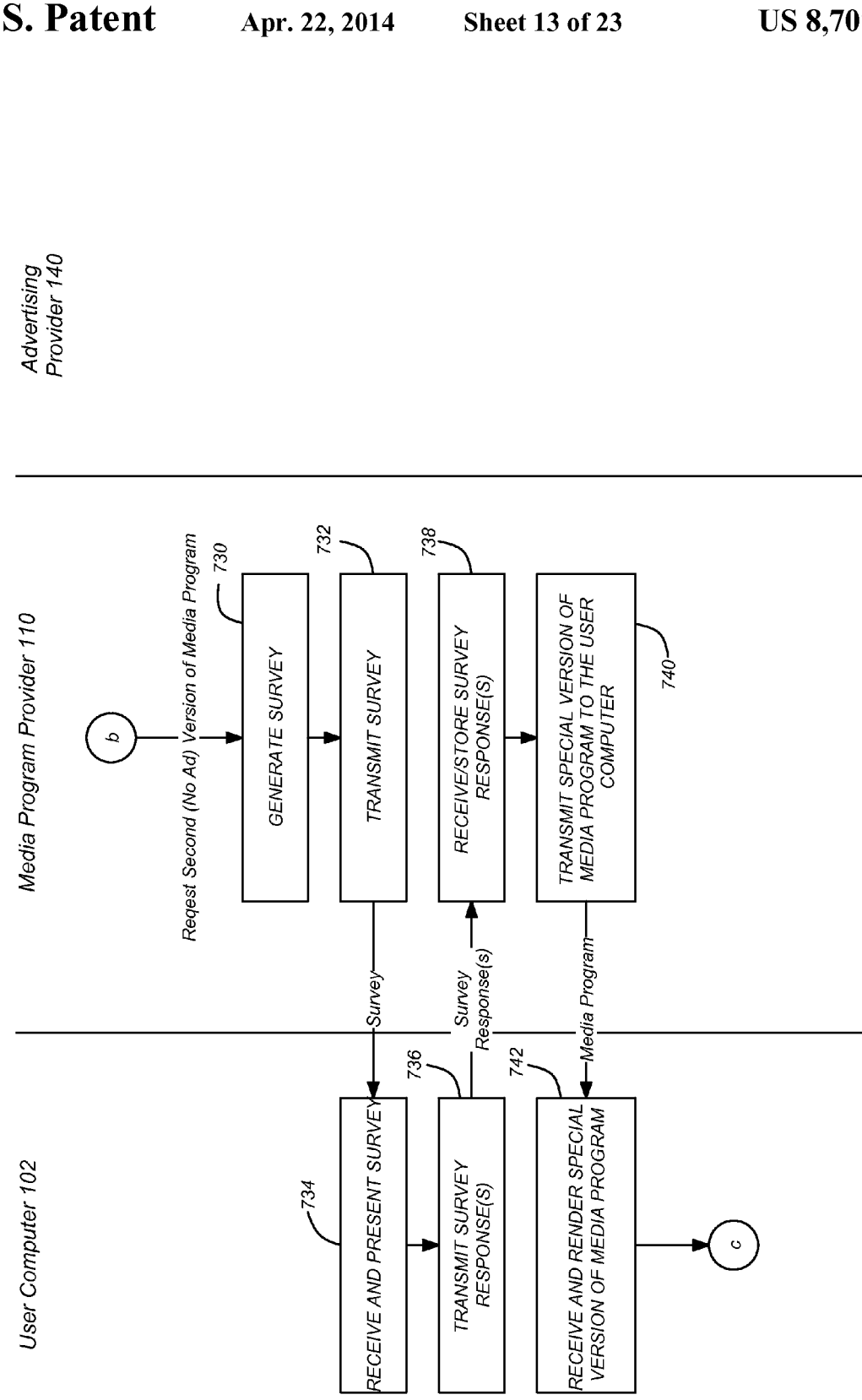

FIGS. 7A-7C are diagrams presenting further detail regarding how a user may be permitted to view the media program with reduced or zero advertisements in exchange for providing compensation in the form of answers to a survey. In block 702, the user computer 102 accepts identity information uniquely associated with a user 132 of the user computer 102. The identity information can be accepted, for example, in an input box of a "masthead" webpage. The identity information is transmitted to the MPP 110 and used to identify the user, as shown in block 703. The user 132 inputs a media program request into the user computer 102, and that request is transmitted to the MPP 110, as shown in block 704. The media program request can be the product of a search hosted by the MPP 110 or by use of a program guide provided by the MPP 110 to the user computer 102.

By offering users 132 the opportunity to watch commercial-free or reduced commercial versions of media programs in exchange for the user's completion of surveys, it is possible to obtain information that assists in determining which advertisements the user 132 may be interested in viewing in the future. This prevents bothering the user 132 with advertisements they are not interested in and also assures that the user 132 will be presented with advertisements that they are likely to have some interest in.

However, if the option to view a media program with reduced advertisements is offered to users indiscriminately, it is possible for users 132 to attempt to avoid watching any advertisements, while providing little or no survey information. For example, in embodiments of the invention that allow users 132 to manage their user information and/or survey information (further described below), the user may enter survey answers, and simply delete or substantially alter them after taking the survey or after viewing the commercial-free version of the media program. Or, users 132 may simply register under different user IDs, enter bogus survey information, and rarely if ever log in using that same user ID again.

Accordingly, it is beneficial to assure that the option to watch a reduced advertising version of the media program is offered only to users 132 who are not attempting to "game" the system by providing little or no survey information in exchange. In one embodiment, this is accomplished by preventing the user from making changes that could be used to "game" the system. However, this may cause legitimate users to shy away from registering or answering a survey. In another embodiment, this can be accomplished by determining whether the identified user is qualified to be offered the reduced advertising option and only offering the option if the user is deemed to be qualified.

Figure 8:
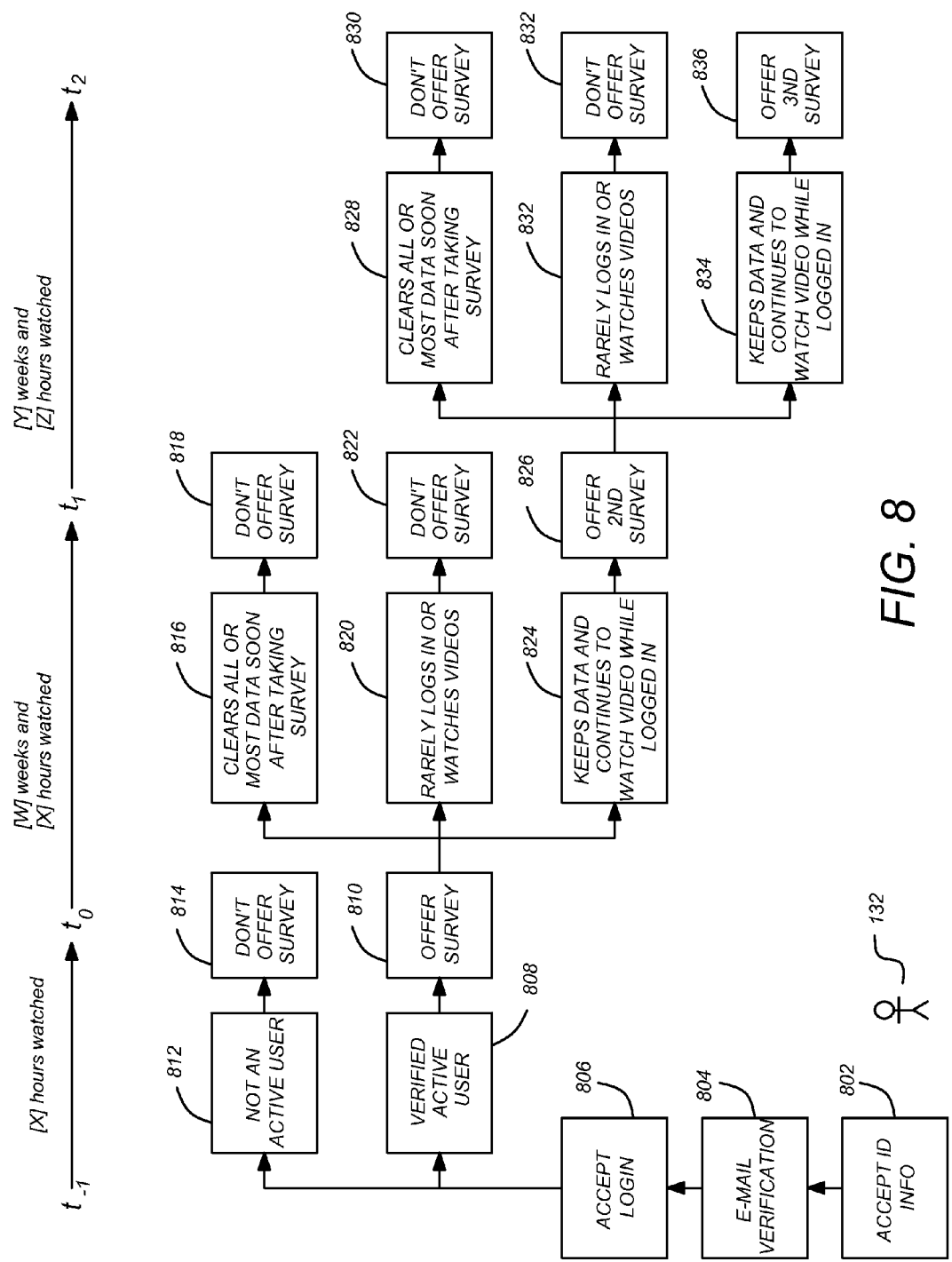
FIG. 8 is a diagram illustrating exemplary operations that can be used to determine whether a user is offered the option of taking a survey to view a special version of the media program.

This functionality is shown in blocks 706-712 of FIG. 7A, and in FIG. 8.

In block 706, the MPP 110 determines whether the identified user 132 is qualified to be offered the option to view a special (e.g. reduced advertising or no advertising) version of the media program in exchange for the user compensation such as providing survey answers. For purposes of discussion, a "reduced advertising version" of the media program may include M advertisements while the standard or full advertising version of the media program includes N advertisements wherein N>M. The special version of the media program may also have zero advertisements (M=0), or may simply provide the advertisements the user selects in the order desired.

If the user 132 (or in cases where the user computer 102 and not the user is identified, the user computer 132) is determined to be qualified to be offered the option to view the special version in exchange for providing user compensation, a webpage offering to provide the reduced advertising version of the media program in exchange for the user compensation is transmitted to the user computer 102, as shown in blocks 708 and 712. If the user is not qualified to be offered this option, a message comprising a webpage that does not offer this option is transmitted to the user computer 102, as shown in blocks 708 and 710. In bock 714, the user computer 102 receives and renders this information to present the option to the user 132 for selection.

Figure 7D:
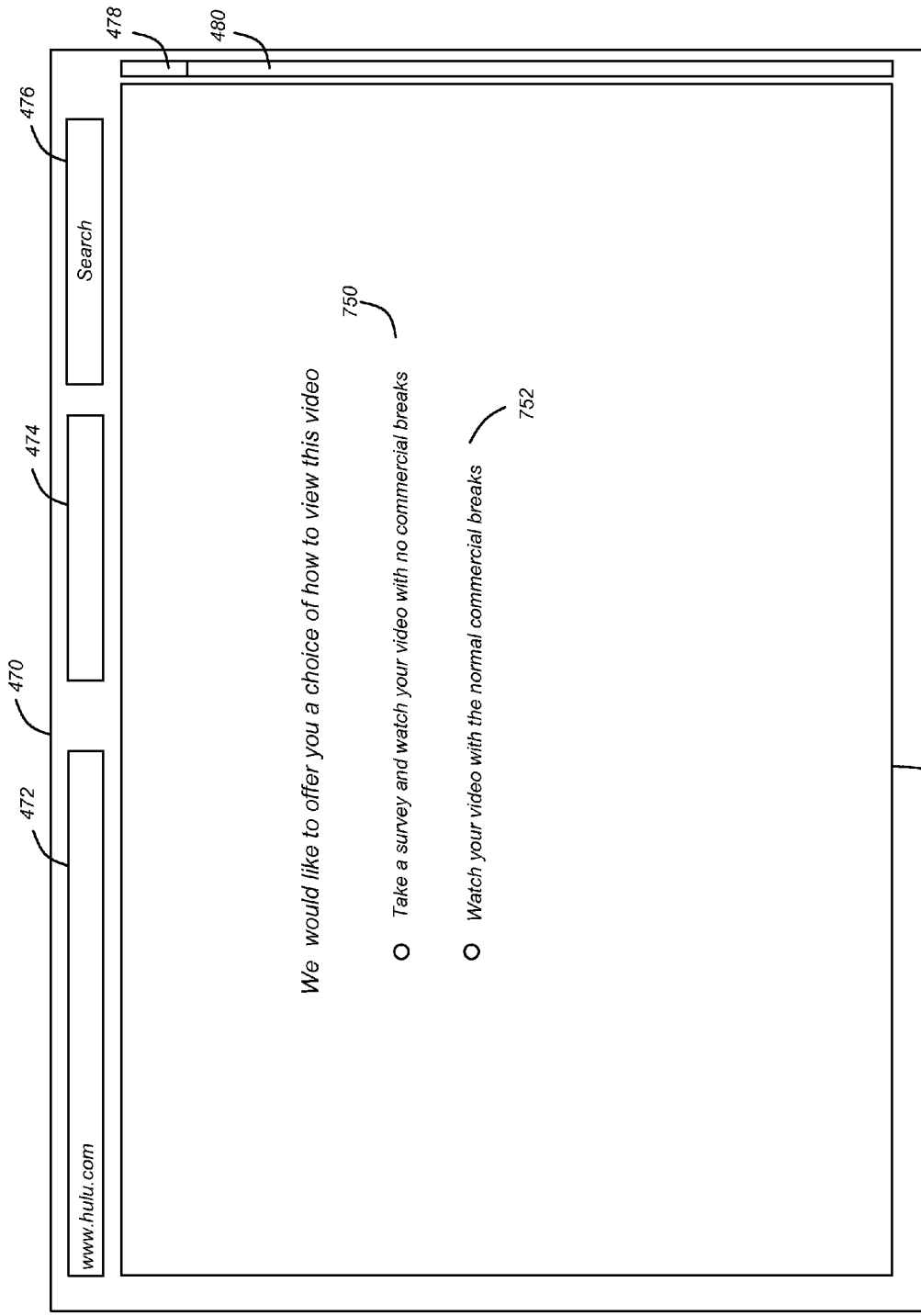
FIG. 7D is a diagram illustrating an embodiment of a rendered webpage offering to provide the reduced advertising version of the media program in exchange for the user's agreement to take a survey.

FIG. 7D is a diagram illustrating one embodiment of a rendered webpage 754 offering to provide the reduced advertising version of the media program in exchange for the user's agreement to take a survey. The webpage 754 includes a first input control 750 which allows the user 132 to take the survey and watch a reduced advertising version of the media program and a second input control 752 which allows the user 132 to view the video with normal commercial breaks.

FIG. 8 is a diagram illustrating exemplary operations that can be used to determine whether an entity is offered the option of taking a survey to view a special version of the media program. In one embodiment, the user 132 is identified and the MPP 110 determines whether the user 132 is to be offered the option of taking a survey in exchange for viewing a special version of the media program. In another embodiment, the user computer 102 is identified.

The process begins with accepting identification information, as shown in block 802. User identification information includes information that uniquely identifies the user 132, such as the new user's name, telephone number, residence address, and/or e-mail address. If an e-mail address is provided, a message may be sent to the e-mail address providing instructions regarding how the registration process can be completed, as shown in block 804. Typically, this involves sending verification information to the MPP 110 for example, by selecting a link at a URL provided in the message.

Typically, this email verification process is sufficient to prevent potential users from gaming the system by creating bogus identities every time they want to watch a media program commercial free, because an e-mail address must be created and a message sent to that e-mail address must be responded to, before the survey option is presented.

User computer 132 information can include a static IP address or processor 204 identification number, and can simply be used to identify the user computer.

Thereafter, the entity may log in by providing suitable identification information, as shown in block 806.

To prevent users from creating and using bogus identities, the MPP 110 may examine historical data for the identified entity (e.g. the user 132 or user computer 102). Such historical data may include (1) a survey history of the identified entity, the survey history comprising a time elapsed since immediately preceding survey responses from the identified entity were accepted, and/or (2) a viewing history of the identified entity.

The viewing history may include viewing duration information for the identified entity since immediately preceding survey responses from the identified entity were accepted, the number of media programs viewed by the identified entity since immediately preceding survey responses from the identified entity were accepted; and/or survey management history of the identified entity, comprising deleted previously accepted survey responses. A minimum interval $t_{-1}-t_0$ can also be enforced before a survey is offered. For example, the minimum interval between creating a user account and being offered a survey may be one day. The MPP 110 may also enforce a minimum viewing interval before a survey is offered. For example, in one embodiment, for new members, no survey will be offered until the viewer has watched at least $x_1$ hours of video, thus qualifying the user as a active (albeit, new) user. This is illustrated in blocks 808-814.

In one embodiment, the user is not offered a new survey until a period of time has elapsed since the last survey was offered and responded to. This is shown in blocks 820-822. For example, if the user 132 was offered a survey on January 1, the user 132 will not be eligible to be offered another survey until w weeks $(t_1-t_0)$ after January 1. In the alternative or addition to this, a minimum viewing time may be enforced, such that the user 132 is not eligible to be offered another survey until the user 132 has viewed at least $x_2$ hours of media programs. For example, if the user 132 has logged in to watch a video only once in the last 10 weeks, that user is deemed not to be an active user, and will not be offered the option of taking a survey. Or, if the user 132 has not viewed more than 30 minutes of media programs in those 10 weeks, the user 132 is also deemed not to be an active user, and will not be offered the option of taking a survey.

As described above, the user 132 or user computer 102 survey history can also be examined to determine if a survey is offered. For example, in embodiments wherein the user 132 is permitted to directly manage their survey data (further described below), the user is also not offered a survey if the user entered data in an earlier survey, only to clear all or a specified amount of the previously accepted survey data shortly (e.g. within hours or days) of watching the media program provided without advertising. This feature prevents the user from gaming the system by providing unusable survey responses. The amount of previously accepted survey responses that may be deleted can be expressed as a number (e.g. no more than two answers deleted) or a percentage (e.g. no more than 5% of the previously accepted survey responses deleted). This is illustrated in blocks 816 and 818.

In a further embodiment, responses from different surveys are compared to assess whether the survey responses are consistent with one another. For example, the response to a survey question may strongly indicate that the user is a strong environmentalist, while the response to another question in the same or different survey may indicate that the user is a strong anti-environmentalist. Such discrepancies can be resolved with further questions, but if left unresolved, can also be used as an indication that the user is not providing random or less than candid answers to the survey questions. In such cases, the user may not be provided with the opportunity to take future surveys, the user may be provided with fewer survey-taking opportunities, or the user may be provided with alternate surveys intended to resolve the discrepancies.

If the user 132 has not excessively modified previous survey data shortly after taking earlier surveys, and is an active user, the user is offered the opportunity to take a second survey, as shown in blocks 824 and 826.

These operations are repeated again as shown in blocks 828-836. In one embodiment, the time period over which the assessment of the user's qualifications to receive a survey changes over time. Hence, instead of assessing whether the user is qualified to receive a survey offer w weeks after taking the last survey, the assessment may take place y weeks after the previous survey. Using staggered or random assessment intervals further confounds the user 132 from gaming the system, because the user 132 cannot predict when another survey might be offered, efforts to game the system in advance of another survey-taking opportunity are difficult to make.

Referring now to FIG. 7B, using the computer 102, the user 132 selects whether to view the special or standard version of the media program (e.g. agreeing to complete a survey in exchange for viewing the special version of the media program by accepting selection 752). The user computer 102 accepts the user selection and generates a message having information indicating that the user would like to complete the survey for transmission to the MPP 110, as shown in block 716.

The MPP 110 receives the information, as shown in block 718. If the information indicates that the request is for the standard version of the media program, advertisements are inserted, and the requested standard of the media program (with standard advertisements) is transmitted to the user computer, as shown in blocks 722 and 726. The advertisements can be retrieved from the advertising provider 140 and inserted by the MPP 110 or the MPP 110 may provide the media program with inserted commercial breaks and links to the advertisements, with the user computer 102 retrieving the advertisements from the advertising provider 140 and inserting them in the media program at the appropriate time.

As shown in FIG. 7C, if the information indicates that the request is for the reduced advertising version of the media program, a survey is generated and a message comprising the survey is transmitted to the user computer 102 as shown in blocks 730 and 732. Further description of how the survey may be generated is presented below with reference to FIG. 12.

The survey is received at the user computer 102 and presented to the user 132, as shown in block 734. The user 132 then answers the survey questions by entering appropriate response into the user computer 102. In one embodiment, the survey questions are multiple choice and/or true-false questions and include "none of the above" and/or "other" answers. "Other" answers may also provide the user 132 with the option of entering text. Such entries can be transmitted to the MPP 110 and used to improve the survey. For example, survey questions that receive "other" answers from an excessive number of users 132 may be improperly worded or badly selected for reasons that can be determined from the text entries provided by the users.

A message comprising the survey responses is then transmitted to the MPP 110 as shown in block 736. The responses are received and stored, as shown in block 738. The responses may also be analyzed at this time to verify that the responses bona fide answers to the questions, for example, by comparing the responses with other responses from earlier surveys or other personal information about the user 132. If the answers are determined to be not bona fide, the user may be informed as such and/or given the opportunity to change their answers or seek help After the responses have been received, the special version of the media program is transmitted to the user computer, as shown in block 740. The media program is received and rendered by the user computer 102 for presentation to the user 132, as shown in block 742.

The survey answers may be used to generate profile information that is used to select advertisements to be provided with further media programs transmitted to the user in the future, or even to determine which options are offered to the user. For example, if previous survey responses indicate that the user 132 has an interest in sports, the user may be (1) presented with sports-related advertising, (2) presented a program guide or other interfaces that emphasize sports-related programming or programming that other sports enthusiasts enjoy, (3) offered special sports programming or programming that other sports enthusiasts enjoy, or (4) asked further survey questions to obtain more information regarding their interest in sports.

In the foregoing embodiment, the offer to provide survey responses in exchange for viewing the special version of the media program was presented in response to a user 132 request to view that particular media program. In other words, the offer was triggered based on a media program request from the user 132. However, this need not be the case. The offer to take the survey in exchange for viewing a special version of a media program can be made in advance of a media program request for the user 132 and may be applied to any media program that the user requests, or a media program selected from a group that is approved for viewing with reduced advertisements. For example, the survey could be offered to the user w weeks after the user 132 completed the most recent survey, whether the user has requested viewing of a particular media program or not. After successfully completing the survey, the user's privilege to view a special (e.g. reduced advertisement) version of the media program may be maintained for a period of time. This allows the user to take the survey when convenient and view a special version of a media program of interest at a later time. The period of time for which the user 132 may "save" such privileges can be a function of how long the user 132 has been an active user or other factors, if desired.

One of the disadvantages of generating user profiles to determine which directed advertising is that users may unwittingly provide answers to questions without understanding the context in which the answer will be used. As a consequence, it is possible that a user profile generated from the survey response will cause advertisements and other information to be directed to the user 132 when in fact, the user 132 has no interest in it. For example, a user 132 may answer a question indicating that they are interested in bikes, and find that they are deluged with advertisements about bicycles instead of motorcycles, as the user 132 intended. While it is true that future survey responses may eventually dilute the effect of the question on the user's profile, that can take time, and can render any directed advertising to the user 132 less effective in the mean time. It is also true that user's circumstances change. For example, a user may become divorced, lose or gain a job (thus affecting their income), and gain or lose family members by birth or death. While such factors can be accounted for in registering for the service, the answers to survey questions that were earlier provided may also be affected by the user's change in circumstances.

Figure 7E:
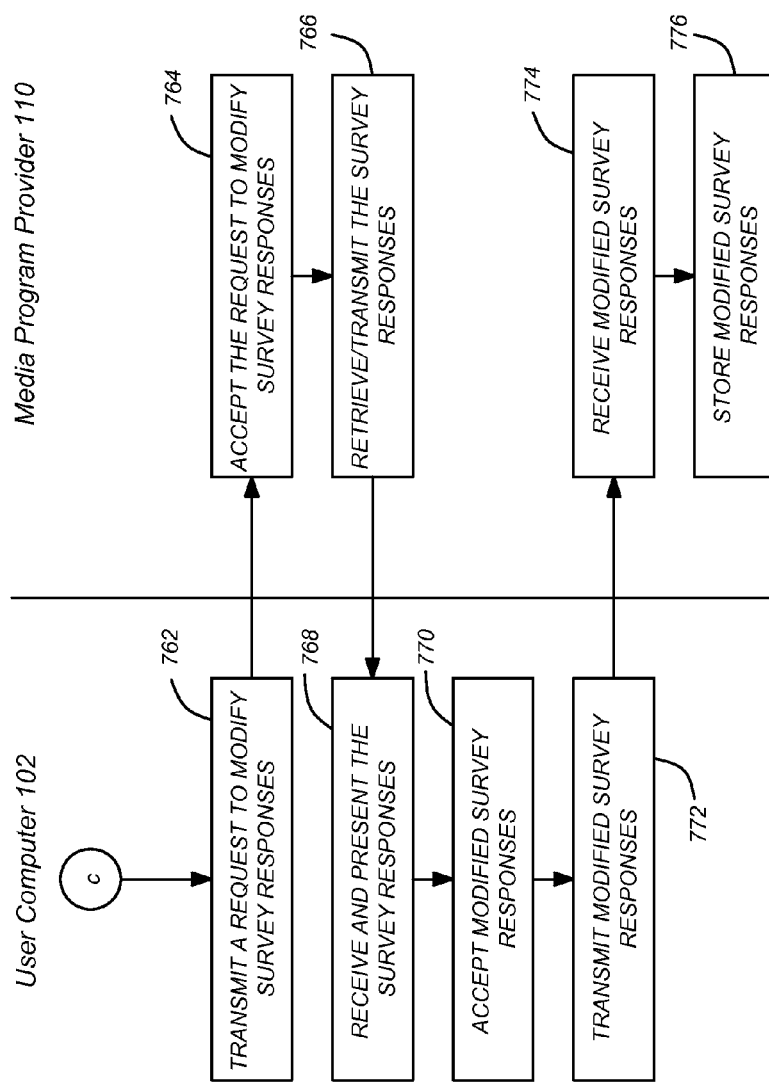
FIG. 7E is a diagram illustrating an embodiment in which the user is permitted to manage their survey response.

FIG. 7E is a diagram illustrating an embodiment in which the user 132 is permitted to manage their survey responses. In block 762, the user 132 enters a request to manage survey responses, and that request is transmitted to the media program provider 110. The media program provider 110 retrieves and transmits the survey responses to the user computer 102, as shown in block 766. The survey responses are received and presented to the user, as shown in block 768. The survey responses may then be modified, deleted, or clarified. In one embodiment, the user 132 is provided an interface by which an answer to a survey response is explained. This can be accomplished by entering text in an input box adjacent the response or the question.

The modified survey responses are accepted and transmitted to the MPP 110, as shown in blocks 770-772. The MPP receives the modified survey responses and stores them for future use, as shown in blocks 774 and 776. If the survey response is deleted, and indication that the survey question was answered and later deleted can be stored.

The media program provider 110 may optionally limit the time period in which the user can modify or delete survey responses. For example, the user may be prohibited from modifying survey responses until a period of time (e.g., a week) has elapsed since they were originally entered. This prevents users from gaming the system by entering survey responses, then immediately changing them. Or, the user may be prevented from changing survey responses after a period of time has elapsed.

The previously entered survey responses can be presented to the user 132 in a variety of ways. In one embodiment, the user 132 is provided with the option of viewing and managing previous survey responses organized by survey.

Figure 9:
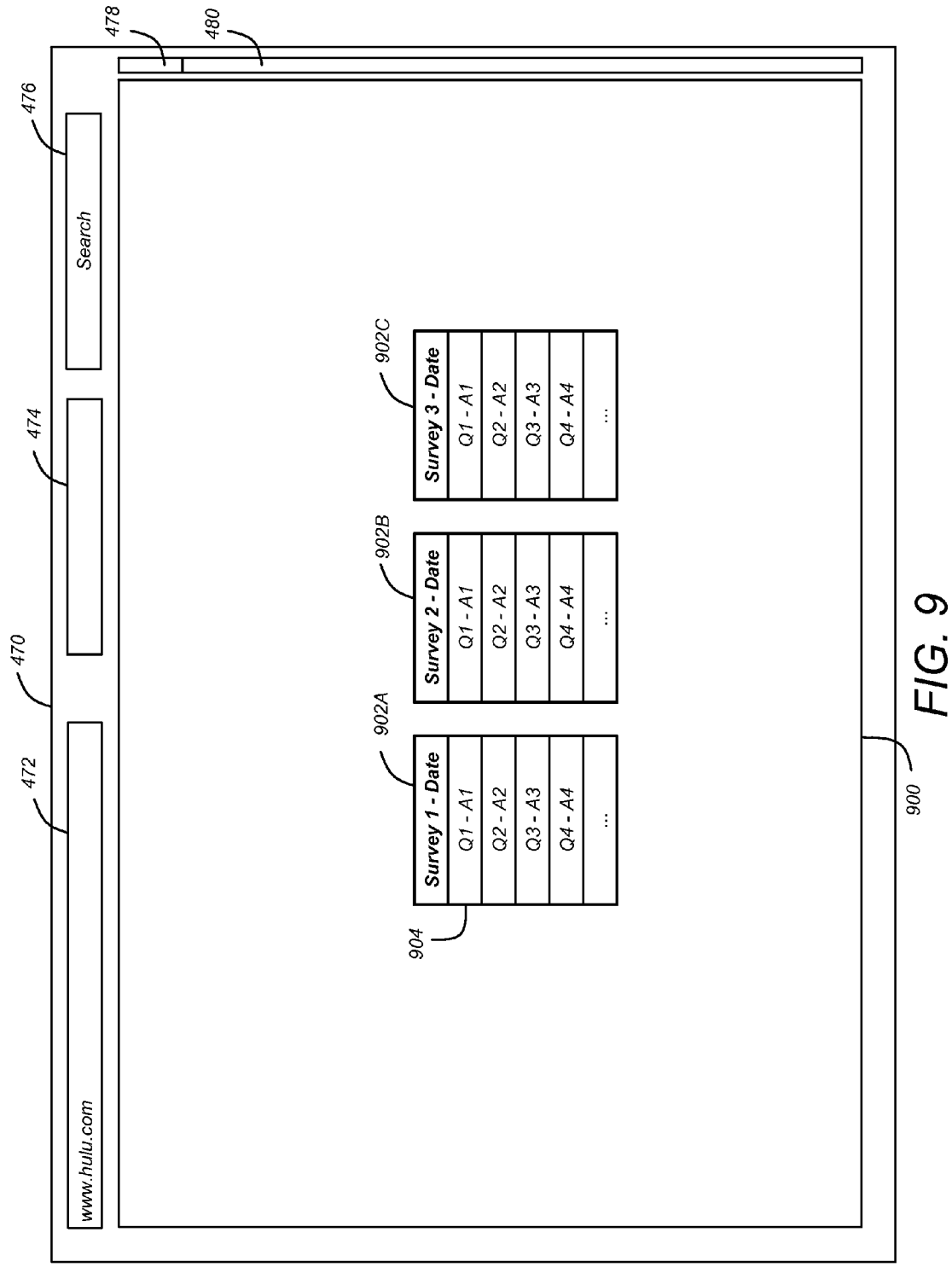
FIG. 9 is a diagram illustrating elements of an embodiment of a user interface that may be presented in a window to provide previously entered survey responses to the user.

FIG. 9 is a diagram illustrating elements of one embodiment of a user interface 900 that may be presented in a window to provide previously entered survey responses to the user 132. In this embodiment, each previously completed survey 902A-902C (hereinafter collectively referred to as survey(s) 902) is presented with the survey questions and the survey answers. The user 132 can go to the survey (e.g. 902A) where a question was asked, select the question/answer pair 904 and modify or delete the survey answer as desired.

Figure 10:
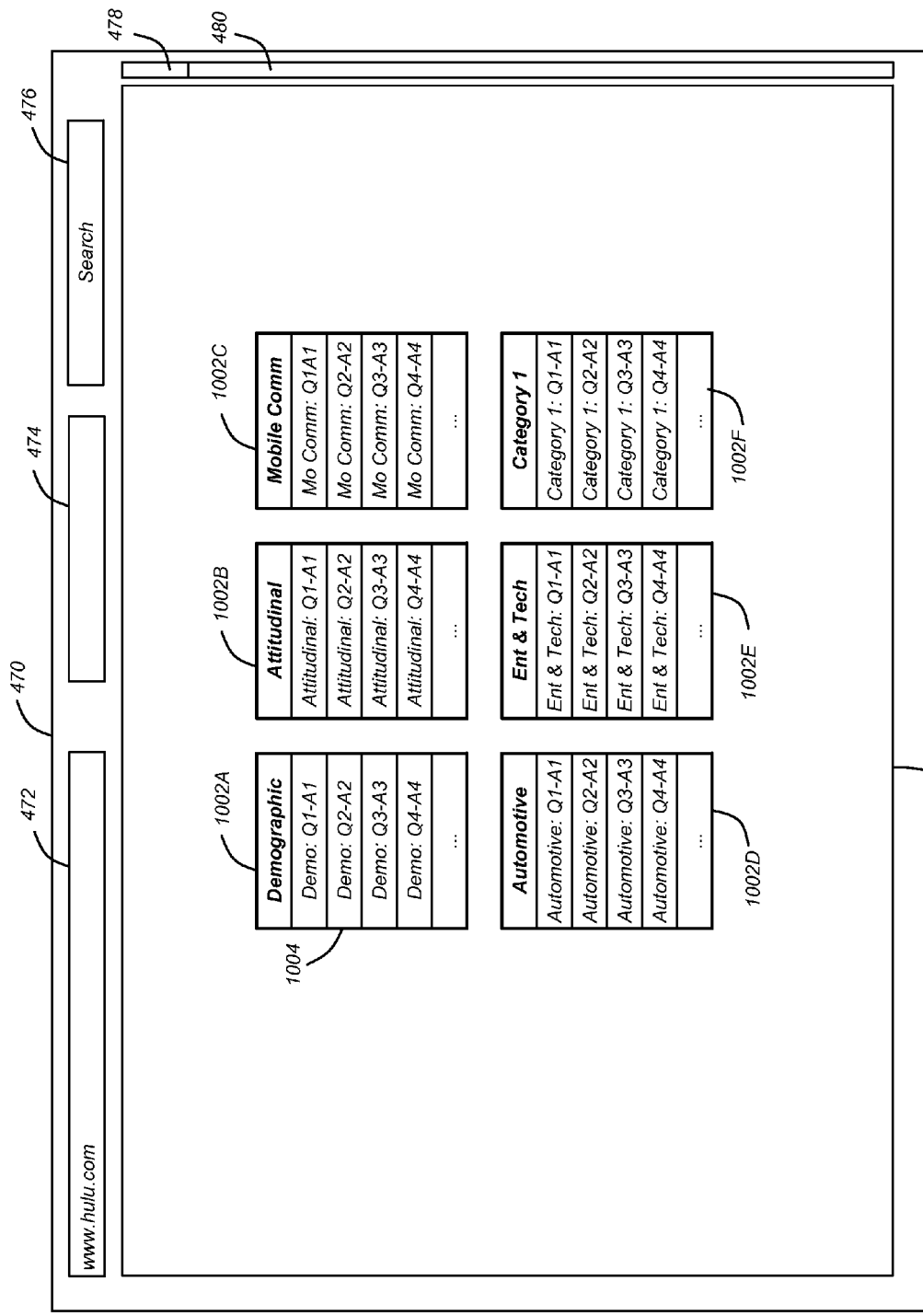
FIG. 10 is a diagram illustrating elements of an embodiment of a user interface that may be presented in a window to provide previously entered survey responses to the user.

FIG. 10 is a diagram illustrating elements of another embodiment of a user interface 1000 for presenting previously entered survey responses to the user 132. In this embodiment, the questions and answers provided in previously completed surveys are presented according by category (1002A-1002F). If a user 132 remembered answering a question related to the automotive category 1002D, the user 132 may select a particular question/answer pair 1004, and modify or remove the answer.

Figure 11A:
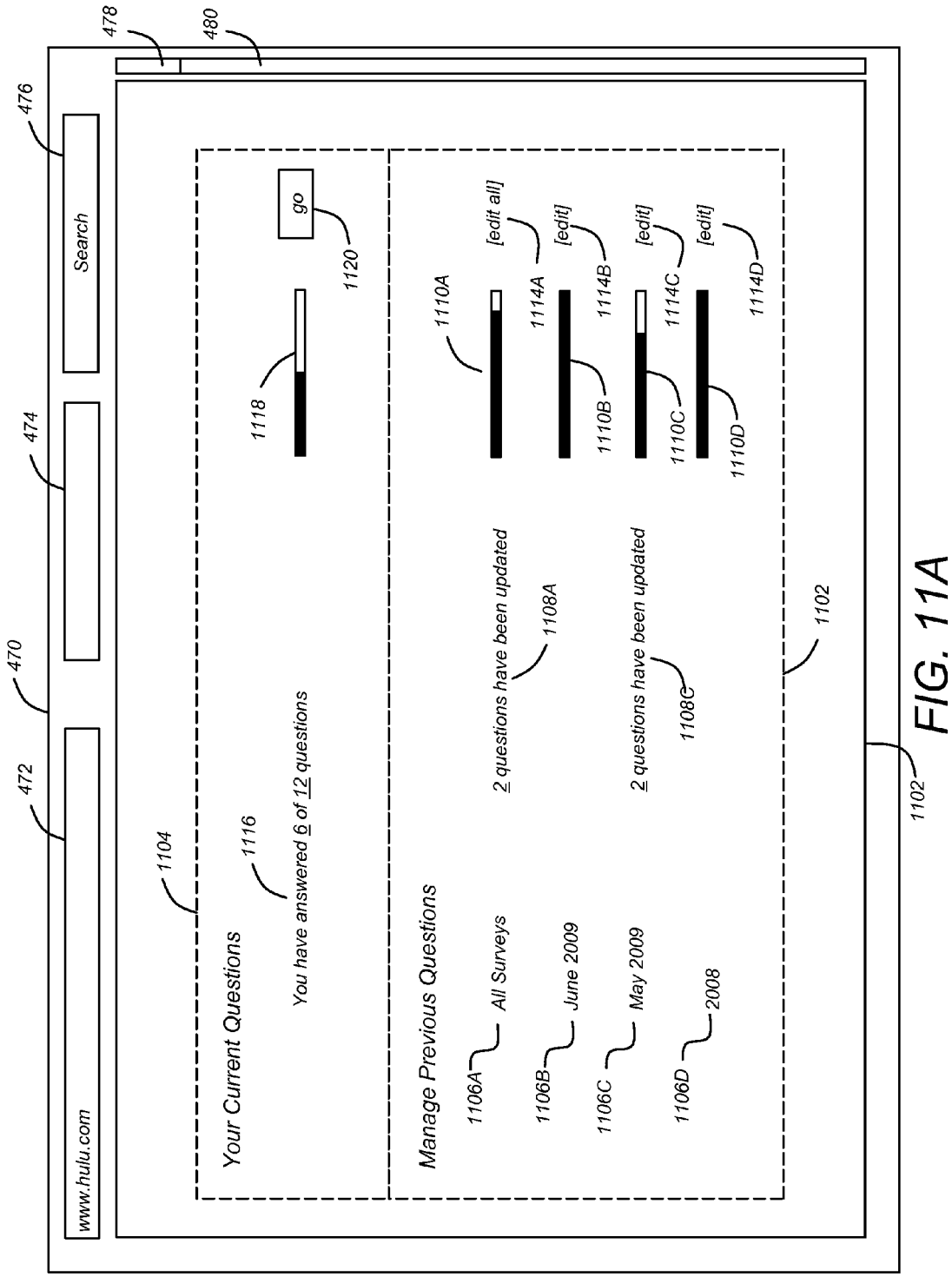
FIGS. 11A and 11B are diagrams illustrating further embodiments of a user interface for managing survey questions.

FIG. 11A is a diagram illustrating another embodiment of a user interface for managing survey questions. In this embodiment, the user interface comprises a webpage 1102 having a first survey management portion 1102 and a second survey management portion 1004. The first survey management portion 1102 can be used to manage answers entered in surveys that have been previously completed. In the illustrated embodiment, the management portion 1102 presents information regarding previously completed surveys including information identifying the survey (in the illustrated embodiment, surveys are identified by the date on which they were completed) 1106A-1106D, information regarding how many of the survey questions of each survey have been modified or deleted (including text 1108A and 1108C). Graphical indicators 1110A-1110D may also be presented showing the proportion of survey questions that have been modified or deleted. The user may modify or delete questions that were provided in earlier surveys by selecting the edit control 1114A-1114D associated with each survey.

Typically, the user 132 is not provided with any special viewing privileges (e.g. viewing the media program without advertisements or viewing all media programs for a particular period such as 24 hours) until the user 132 has completed the entire survey. In one embodiment, the user 132 is permitted to save the answers to partially completed survey so that the survey can be completed later. This is useful in situations where the user 132 would like time to ponder the question asked of when the user 132 does not have enough time to complete the entire survey.

The illustrated user interface 1102 also comprises a second survey management portion 1104 that permits the user to return to partially completed surveys so that they can be fully completed. In the illustrated embodiment, a text portion 1106 indicates how many questions of the current survey have been answered, and the graphic 1118 provides a visual indication of the proportion of unanswered questions to the total number of questions in the survey. The user 132 can return to the partially completed survey to provide additional answers or to modify answers already given by selecting the "go" control 1120.

In the illustrated embodiment, a rule has been enforced that requires that no further survey is to be offered to a user 132 unless all of the previous surveys have been completed. Hence, there is only one uncompleted survey, and only one is presented in the second portion 1104. However, other embodiments permitting users to save the results from more than one uncompleted survey and to return to those partially completed surveys to answer further questions or modify answers already given are also possible. The interface for such embodiments could be analogous to the interface presented by the first portion 1102.

The user 132 may also view, modify and/or delete answers provided to previous survey questions. This is accomplished by generating information correlating user profile parameters or other information to survey responses, transmitting this correlation information along with retrieved survey responses and questions to the user computer, for presentation to the user. The user can then view survey questions and responses and make changes to the responses as desired.

Figure 11B:
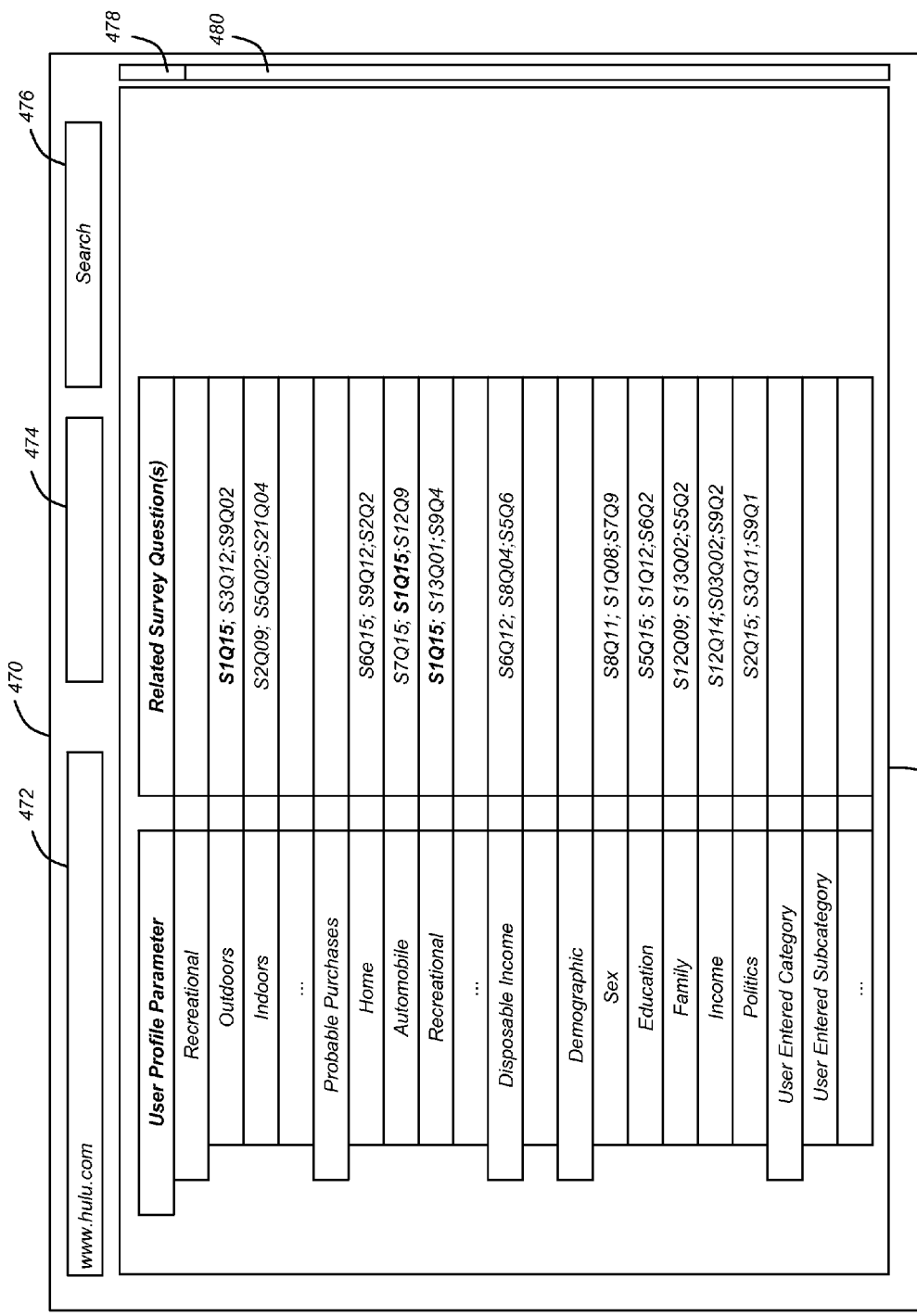

FIG. 11B is a diagram illustrating another embodiment of a user interface 1150 that allows the user to view, modify, and/or delete answers provided to previous survey questions. In this embodiment, user profile information generated from the survey responses is correlated to the questions asked in the surveys and the responses provided by the user. For example, the user profile information can be generally categorized into how the user spends recreational time (indoors or outdoors), probable purchases, disposable income, and demographics. Survey questions related to those user profile parameters are listed adjacent to the parameter. For example questions related to whether the user prefers outdoor recreation include question fifteen of survey one (S1Q15), question twelve of survey three (S3Q12), and question two of survey nine (S9Q02). Note that a particular question may be relevant to more than one profile parameter. For example, question fifteen from survey one is relevant to the outdoor, automobile, and recreational parameters.

As described above, the offer to a user 132 to take a survey in exchange for viewing media program(s) without advertisements can be made in advance of the user selection of a media program, immediately after the user selects a media program for viewing, or during the view of a media program. In one embodiment, benefit provided to the user 132 for taking the survey is a function of the survey characteristics. For example, the user may be provided with greater reward for answering questions in a survey that ask more difficult or complex questions, or for responding to a survey having a more questions. One example of the different survey types, how they are offered to the user 132, the number of questions asked in the survey, the use reward for completing the survey, and how partially completed surveys may be saved for later completion is illustrated in Table I, below:

TABLE I

|  | Long Survey | Selection Survey | Single Question Survey |
|---|---|---|---|
| How Offered | A tab or control in masthead or user's homepage | Dynamically inserted prior to video (opt out option) | Dynamically inserted into advertising breaks (opt out option) |
| Number of Questions; Expected Completion Time | 10-15 questions; time period of less than about 5 minutes | Varies by the length of the media program: Half episodes, 2-3 questions; time period less than 1.5 minutes Full episodes, 3-6 questions; time period (for completion of survey) less than 2.5 minutes | One question; time period for completion of survey less than 30 seconds. |
| User Reward | 24 Hours of advertisement-free viewing time commencing upon completion or 1000 charitable impressions (if available) | Watch media program advertisement-free. (Option to not take survey and watch media program with advertisements). | Answer and return to media program upon completion; option to view video instead (preference can be set to bypass offer) |
| Partial Completion | Survey can be saved so that survey can be completed at a later time. | Survey must be completed before media program begins; user can cancel survey to view media program with advertisements | Survey must be completed when presented |

As shown above, the user reward for completing a survey is typically the privilege of viewing the media program with fewer advertisements or none at all. However, other user rewards are also possible. For example, in lieu of 24 hours of advertisement-free viewing, the user may select a user reward of a number of "impressions" that will be given to the organization of their choice. For example, the user 132 may be offered the option of providing 1000 "impressions" to a charitable organization such as the MARCH OF DIMES. An "impression" in this context, refers to an event in which a user views an advertisement. Hence, if 1000 impressions are donated to a charity, that charity's advertisement will be presented to some user(s) 1000 times.

Figure 12:
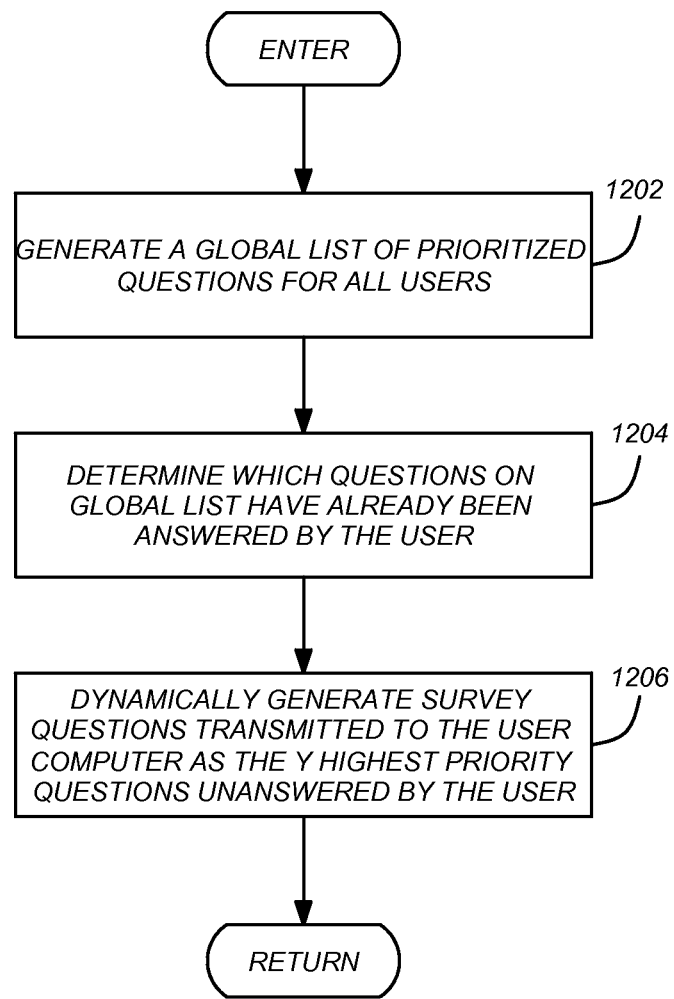
FIG. 12 is a diagram presenting exemplary method steps that can be used to generate the survey questions that are transmitted to the user.

FIG. 12 is a diagram presenting exemplary method steps that can be used to generate the survey questions that are transmitted to the user 132. First, a global list of prioritized questions is generated from the locus of all active questions. Questions may be deleted from the locus of all questions, for example, if the question has been deemed misleading or unhelpful, and new questions can be added to the locus of active questions time. The global list is applicable to all users. Before a particular user 132 is to be transmitted a survey, a list of questions already answered by the user 132 is compared to a the global list of prioritized questions to identify questions that have already been answered by the user 132, as shown in block 1204. In block 1206, survey questions are generated dynamically (e.g. in near real time in response to a demand from the user 132) and transmitted to the user 132, as shown in block 1206. The transmitted survey questions can include the highest priority questions from the global list of prioritized questions, after excluding those questions the user has already answered. Other questions may be included as well.

As noted above, the user 132 can delete responses previously provided to survey questions. Questions associated with such deleted responses may be removed from the list of questions that the user 132 has already answered, thus allowing the question to be asked in another survey. Or, if desired, questions associated with deleted responses can be retained on the list of questions that the user 132 has already answered, thus preventing the user from being asked the same question a second time.

Figure 13:
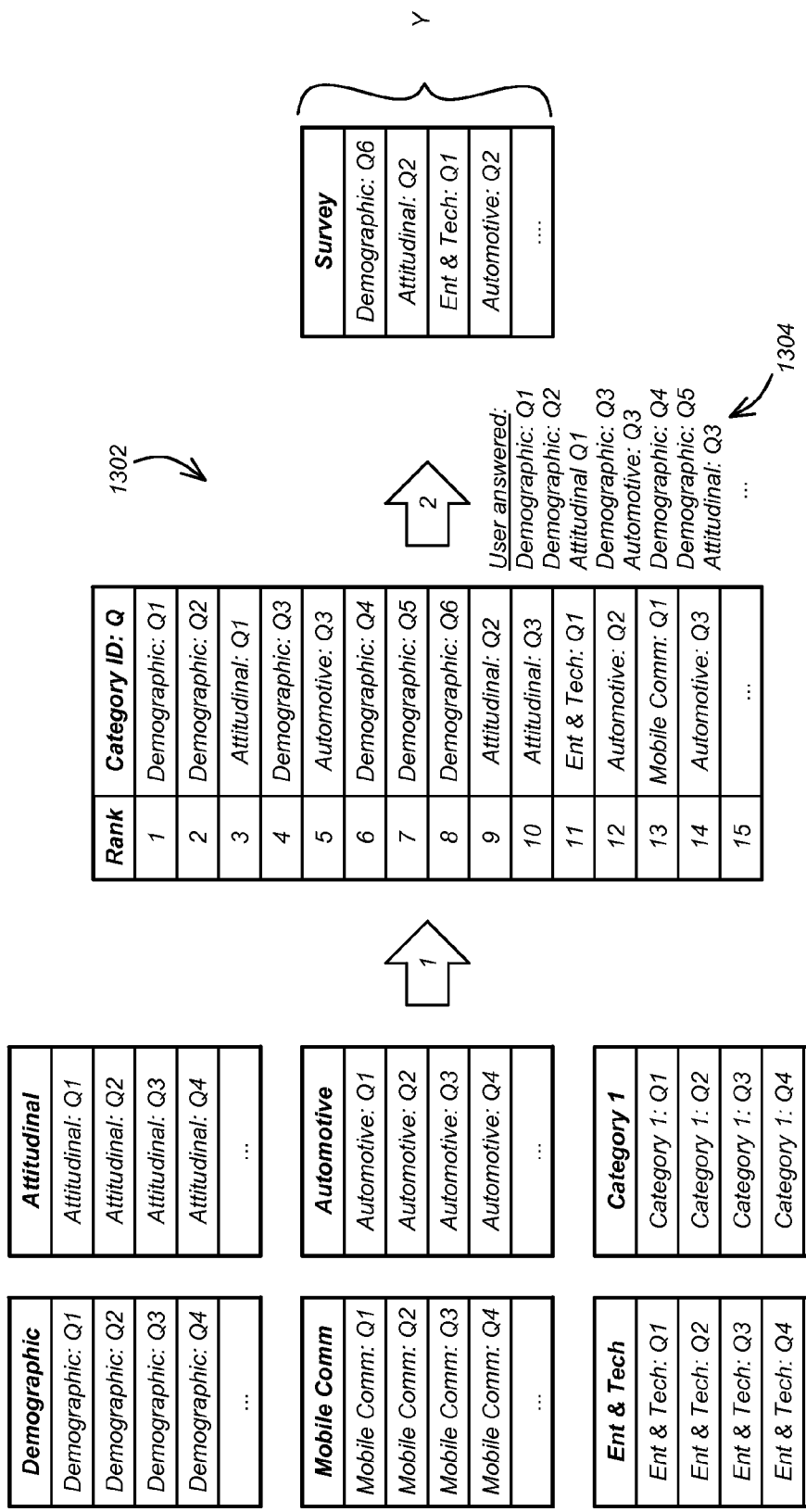
FIG. 13 is a diagram illustrating the generation of survey questions.

FIG. 13 is a diagram illustrating the generation of survey questions. As illustrated by the first arrow, all active questions from all the categories are combined into a global list that is then prioritized. The resulting global list of prioritized questions 1302 is then compared to a list 1304 of questions the user 132 has already provided answers to. The survey is then generated to include the top questions on the prioritized list that have not already been answered by the user 132.

Figure 14:
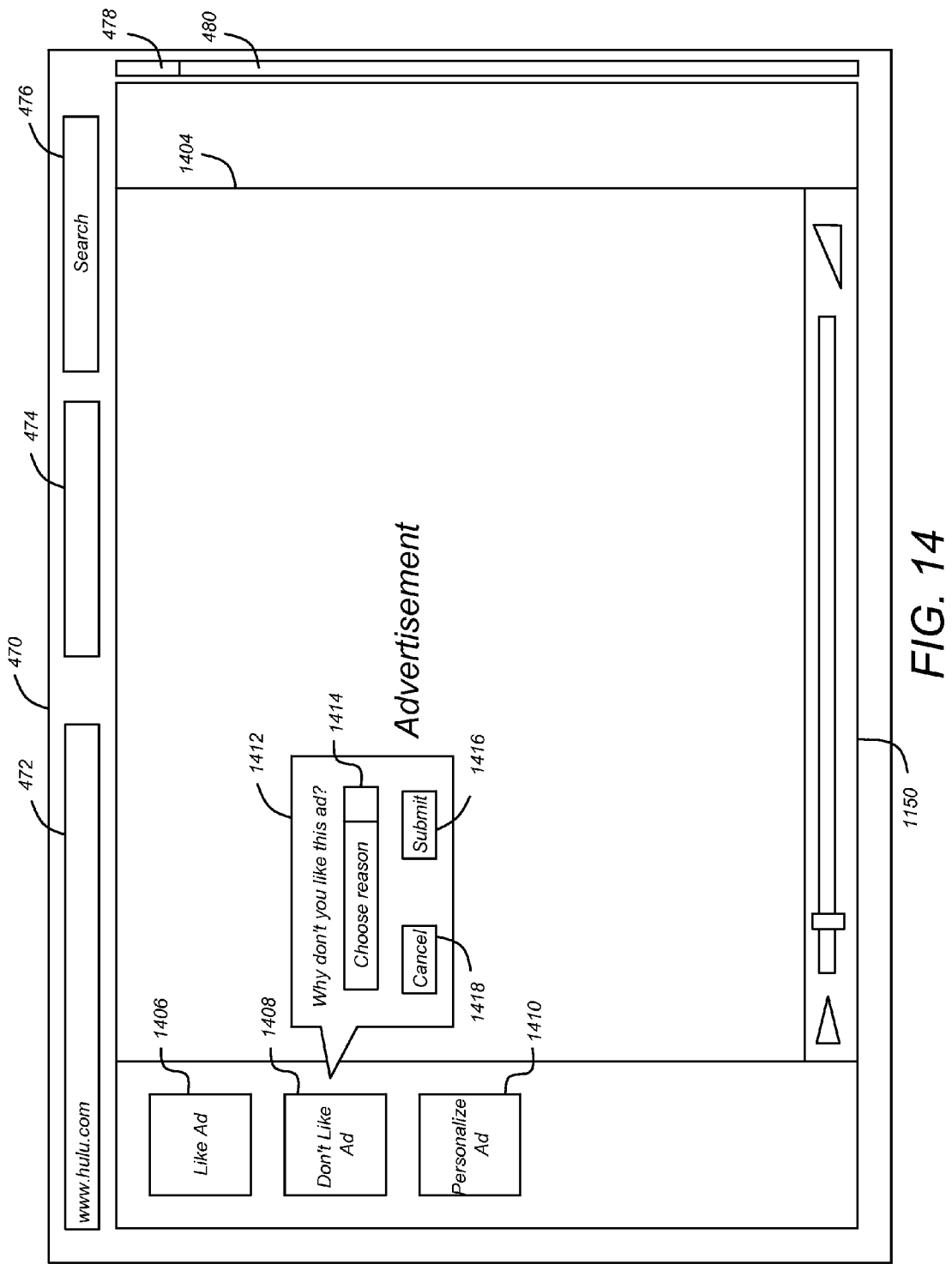
FIG. 14 is a diagram illustrating an exemplary user interface that can be provided to allow the user to provide feedback about a viewed advertisement.

In one embodiment of the invention, the user 132 is given the opportunity to provide feedback on the desirability of the advertisements presented. FIG. 14 is a diagram illustrating an exemplary user interface 1402 that can be provided to the user 132 after the user has viewed an advertisement. The interface 1402 includes a media player 1404, which played the advertisement, a first control 1406 for indicating that the advertisement was liked by the user 132 and a second control 1408 for indicating that the advertisement was not liked by the user 132. Selection of either the first control 1406 or the second control 1408 opens a control set 1412 in which the user 132 can indicate why they liked or didn't like the advertisement. The user 132 indicates as such by selecting a choice from a menu of choices in the input box 1414, and selecting the "submit" control 1416. If the control set 1412 is open and the user 132 has decided not to provide a reason or offer an opinion on the advertisement, the user 132 may select the "cancel" control 1418. Responses for why the user 132 likes the advertisement can include that it is entertaining or relevant, while responses for why the user does not like the advertisement can include that it is offensive, not relevant (the user does not plan on purchasing the depicted kind of product or service or prefers a different brand), repetitive, too loud, or was inserted at an inopportune time into the media program. Further, the user may be permitted to enter "other" in answer to whether they did or did not like the ad. The user may be compensated for providing feedback (e.g. in the form of reduced advertisements), or not. However, even in cases where the user is not provided direct compensation for providing feedback, the user is still provided some benefit, because the user's answers can be used to more accurately select future advertisements.

The user may also select the "personalize ad" control 1410, if the user would like to take a survey having one or more survey questions. In one embodiment, the survey questions are weighted towards questions or question categories that have been deemed relevant in choosing the advertisement for the user 132 to view. For example, if the user 132 had previously expressed an interest in sports cars, and the advertisement presented was for sports cars, the survey questions presented in response to the selection of the personalize ad control 1410 can be survey questions that explore the user's interest in sports cars in greater detail (e.g. do they prefer foreign or domestic sports cars or whether sports sedans of interest).

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving, by a computer server, a request to access video content from a client device and identification information identifying at least one of a user account and the client device;
determining, by the server, whether to generate an offer for an enhanced access to the video content in exchange for completion of a survey by one or more persons identified by the identification information, based at least in part on analyzing a viewing history by the one or more persons to determine if the one or more persons are considered an active user based on videos viewed by the one or more persons and analyzing responses given by the one or more persons for one or more prior surveys that were offered by the media program provider to the one or more persons in a database accessible to the server;
transmitting the offer to the client device when it is determined that the offer should be generated;
detecting one of acceptance of the offer or rejection of the offer, based on a signal from the client device; and
providing to the client device, based on the detecting, a selected one of (a) the enhanced access to the video content with at least one advertisement selected based on one or more survey responses received from the client device in response to the survey, or (b) non-enhanced access to the video content.

2. The method of claim 1, further comprising providing the survey to the client device in response to detecting the acceptance of the offer, and receiving the one or more survey responses from the client device in response to the survey.

3. The method of claim 2, further comprising selecting the at least one advertisement for providing with the enhanced access to the video content, based on the one or more survey responses.

4. The method of claim 2, further comprising generating the survey, comprising generating a list of prioritized questions, determining which of the list of prioritized questions are unanswered by the one or more persons, and selecting survey questions provided to the client device in priority order from questions unanswered by the one or more persons.

5. The method of claim 1, further comprising determining the one or more prior surveys offered to the one or more persons, comprising at least one of: time elapsed since immediately preceding survey responses from the one or more persons were received, or a quantity of preceding survey responses deleted from the database by request of the one or more persons.

6. The method of claim 1, further comprising determining the one or more prior surveys offered to the one or more persons comprising a number of different videos provided to a client device identified with the one or more persons since a most recent immediately preceding survey response from the one or more persons was received by the server.

7. The method of claim 1, wherein determining whether to generate the offer further comprises determining that an amount of time elapsed since a most recent immediately preceding survey response was received from the one or more persons is less than a survey time period, and a count of videos viewed by the one or more persons since the most recent immediately preceding survey responses were received exceeds a defined threshold number.

8. The method of claim 1, wherein the enhanced access to the video content comprises fewer advertisements than the non-enhanced access to the video content.

9. The method of claim 1, wherein transmitting the offer is performed in response to an advertisement break detected in the video content playing on the client device.

10. The method of claim 1, further comprising receiving a message from the client device comprising user comments regarding an advertisement presented in the standard version of the video content.

11. The method of claim 1, wherein determining whether to generate the offer is further based on a login history of the one or more persons comprising an elapsed time since the one or more persons logged into the server.

12. The method of claim 1, further comprising receiving modified responses after first collecting the survey responses, and replacing the survey responses with the modified responses.

13. The method of claim 1, further comprising correlating the at least one advertisement with corresponding ones of the survey responses, and presenting the corresponding ones of the survey responses with the at least one advertisement.

14. The method of claim 1, further comprising organizing the survey responses into a plurality of topical categories.

15. The method of claim 1, further comprising organizing the survey responses into a plurality of categories based on when each survey response is received by the server.

16. The method of claim 1, further comprising correlating profile information with the survey responses, and presenting the survey responses with the correlated profile information.

17. An apparatus, comprising:
a video content server computer, having a processor and a memory coupled to the processor, the memory storing instructions which, when executed by the processor, cause the computer to perform the operations of:
receiving a request to access video content from a client device and identification information identifying at least one of a user account and the client device;
determining whether to generate an offer for an enhanced access to the video content in exchange for completion of a survey by one or more persons identified by the identification information, based at least in part on analyzing a viewing history by the one or more persons to determine if the one or more persons are considered an active user based on videos viewed by the one or more persons and analyzing responses given by the one or more persons for one or more prior surveys that were offered by the media program provider to the one or more persons in a database accessible to the server;
transmitting the offer to the client device when it is determined that the offer should be generated;
detecting one of acceptance of the offer or rejection of the offer, based on a signal from the client device; and
providing to the client device, based on the detecting, a selected one of (a) the enhanced access to the video content with at least one advertisement selected based on one or more survey responses received from the client device in response to the survey, or (b) non-enhanced access to the video content.

18. The apparatus of claim 17, wherein the memory stores further instructions for providing the survey to the client device in response to detecting the acceptance of the offer, and receiving the one or more survey responses from the client device in response to the survey.

19. The apparatus of claim 18, wherein the memory stores further instructions for selecting the at least one advertisement for providing with the enhanced access to the video content, based on the one or more survey responses.

20. The apparatus of claim 18, wherein the memory stores further instructions for generating the survey, comprising generating a list of prioritized questions, determining which of the list of prioritized questions are unanswered by the one or more persons, and selecting survey questions provided to the client device in priority order from questions unanswered by the one or more persons.

21. The apparatus of claim 17, wherein the memory stores further instructions for determining the one or more prior surveys offered to the one or more persons, comprising at least one of: time elapsed since immediately preceding survey responses from the one or more persons were received, or a quantity of preceding survey responses deleted from the database by request of the one or more persons.

22. The apparatus of claim 17, wherein the memory stores further instructions for determining the one or more prior surveys offered to the one or more persons comprising a number of different videos provided to a client device identified with the one or more persons since a most recent immediately preceding survey response from the one or more persons was received by the server.

23. The apparatus of claim 17, wherein the memory stores further instructions for determining whether to generate the offer by determining that an amount of time elapsed since a most recent immediately preceding survey response was received from the one or more persons is less than a survey time period, and a count of videos viewed by the one or more persons since the most recent immediately preceding survey responses were received exceeds a defined threshold number.

24. The apparatus of claim 17, wherein the memory stores further instructions for configuring the enhanced access to the video content to include fewer advertisements than the non-enhanced access to the video content.

25. The apparatus of claim 17, wherein the memory stores further instructions for transmitting the offer in response to an advertisement break detected in the video content playing on the client device.

26. The apparatus of claim 17, wherein the memory stores further instructions for receiving a message from the client device comprising user comments regarding an advertisement presented in the standard version of the video content.

27. The apparatus of claim 17, wherein the memory stores further instructions for determining whether to generate the offer further based on a login history of the one or more persons comprising an elapsed time since the one or more persons logged into the server.

28. The apparatus of claim 17, wherein the memory stores further instructions for receiving modified responses after first collecting the survey responses, and replacing the survey responses with the modified responses.

29. The apparatus of claim 17, wherein the memory stores further instructions for correlating the at least one advertisement with corresponding ones of the survey responses, and presenting the corresponding ones of the survey responses with the at least one advertisement.

30. The apparatus of claim 17, wherein the memory stores further instructions for organizing the survey responses into a plurality of topical categories.

31. The apparatus of claim 17, wherein the memory stores further instructions for organizing the survey responses into a plurality of categories based on when each survey response is received by the server.

32. The apparatus of claim 17, wherein the memory stores further instructions for correlating profile information with the survey responses, and presenting the survey responses with the correlated profile information.

* * * * *